(12) United States Patent
McDougall et al.

(10) Patent No.: US 8,234,136 B2
(45) Date of Patent: Jul. 31, 2012

(54) DOCUMENT PROCESSES OF AN ORGANIZATION

(75) Inventors: Scott Hanly McDougall, Stonehaven (GB); John Neil Morrison, Aberdeen (GB); Ian Thomas Finlayson, Banchory (GB); Jason Donald Denne, Aberdeen (GB)

(73) Assignee: Accenture Global Services Limited, Dublin (IE)

( * ) Notice: Subject to any disclaimer, the term of this patent is extended or adjusted under 35 U.S.C. 154(b) by 1834 days.

(21) Appl. No.: 11/216,494

(22) Filed: Aug. 31, 2005

(65) Prior Publication Data

US 2006/0053168 A1   Mar. 9, 2006

(51) Int. Cl.
*G06Q 30/00* (2006.01)

(52) U.S. Cl. .................................. 705/7; 705/8; 705/9

(58) Field of Classification Search .................. 705/7, 8, 705/9
See application file for complete search history.

(56) References Cited

U.S. PATENT DOCUMENTS

| | | |
|---|---|---|
| D240,961 S | 8/1976 | Hotchkiss |
| D312,654 S | 12/1990 | Giordano |
| 5,079,723 A | 1/1992 | Herceg et al. |
| 5,295,244 A | 3/1994 | Dev et al. |
| 5,668,966 A | 9/1997 | Ono et al. |
| 5,675,752 A | 10/1997 | Scott et al. |
| 5,701,137 A | 12/1997 | Kiernan et al. |
| 5,812,135 A | 9/1998 | Kotchey |
| 5,838,966 A | 11/1998 | Harlan |
| 5,854,749 A | 12/1998 | Kellams et al. |
| 5,977,971 A | 11/1999 | Guzak et al. |
| D418,120 S | 12/1999 | Okura et al. |
| D424,541 S | 5/2000 | Mugura |
| 6,078,320 A | 6/2000 | Dove et al. |
| D427,574 S | 7/2000 | Sawada et al. |
| D428,894 S | 8/2000 | Chatfield et al. |
| D437,601 S | 2/2001 | Utsuki et al. |
| D437,858 S | 2/2001 | Yasui et al. |
| 6,185,476 B1 | 2/2001 | Sakai |
| D441,761 S | 5/2001 | Machida et al. |
| D441,762 S | 5/2001 | Mugura |
| 6,225,998 B1 | 5/2001 | Okita et al. |
| D453,768 S | 2/2002 | Wilkins |
| D454,139 S | 3/2002 | Feldcamp |
| 6,384,849 B1 | 5/2002 | Morcos et al. |
| 6,396,516 B1 | 5/2002 | Beatty |

(Continued)

OTHER PUBLICATIONS

GE Annual Report 2001, "GE business digital cockpit", Copyright General Electric Company, 2002.*

(Continued)

*Primary Examiner* — Nga B. Nguyen

(74) *Attorney, Agent, or Firm* — Finnegan, Henderson, Farabow, Garrett & Dunner, LLP

(57) ABSTRACT

A method and system for documenting processes and controls of an organization involve storing information describing the processes of the organization in a database and then accessing the database with a suitable user interface application. Preferably the user interface application is a web browser and the data in the database is provided to users as a series of web pages. Using the user interface application, users can review the documented processes, report errors, request changes, generate reports, and so forth. Users with suitable access privileges can modify the data in the database using the user interface application. An external auditor can audit the processes and controls of the organization from his own office by accessing the database over a network such as the Internet.

22 Claims, 20 Drawing Sheets

U.S. PATENT DOCUMENTS

| | | | |
|---|---|---|---|
| 6,407,760 B1 | 6/2002 | Aritomi | |
| D463,444 S | 9/2002 | Istvan et al. | |
| 6,462,762 B1 | 10/2002 | Ku et al. | |
| 6,469,719 B1 | 10/2002 | Kino et al. | |
| 6,501,485 B1 | 12/2002 | Dash et al. | |
| D468,322 S | 1/2003 | Walker et al. | |
| 6,518,986 B1 | 2/2003 | Mugura | |
| 6,518,987 B1 | 2/2003 | Crevasse et al. | |
| 6,559,867 B1 | 5/2003 | Kotick et al. | |
| D476,015 S | 6/2003 | Ombao et al. | |
| D477,327 S | 7/2003 | Emig et al. | |
| D478,595 S | 8/2003 | Wilkins et al. | |
| D480,733 S | 10/2003 | Hammerquist et al. | |
| D481,736 S | 11/2003 | Ombao et al. | |
| 6,677,968 B1 | 1/2004 | Appelman | |
| 6,681,138 B2 | 1/2004 | Mohler et al. | |
| D486,834 S | 2/2004 | Allen et al. | |
| 6,765,597 B2 | 7/2004 | Barksdale et al. | |
| 6,973,357 B2 | 12/2005 | Humpert et al. | |
| 6,990,636 B2 * | 1/2006 | Beauchamp et al. | 715/764 |
| D526,323 S | 8/2006 | McDougall et al. | |
| D526,324 S | 8/2006 | McDougall et al. | |
| D526,653 S | 8/2006 | McDougall et al. | |
| D526,654 S | 8/2006 | McDougall et al. | |
| D526,655 S | 8/2006 | McDougall et al. | |
| D527,387 S | 8/2006 | McDougall et al. | |
| D527,388 S | 8/2006 | McDougall et al. | |
| D527,735 S | 9/2006 | McDougall et al. | |
| D527,736 S | 9/2006 | McDougall et al. | |
| D533,182 S | 12/2006 | McDougall et al. | |
| 2001/0029508 A1 | 10/2001 | Okada et al. | |
| 2002/0030700 A1 | 3/2002 | Arnold | |
| 2002/0065701 A1 * | 5/2002 | Kim et al. | 705/9 |
| 2002/0105552 A1 | 8/2002 | Lane | |
| 2002/0109735 A1 | 8/2002 | Chang et al. | |
| 2002/0122068 A1 | 9/2002 | Tsuruoka | |
| 2002/0154177 A1 | 10/2002 | Barksdale et al. | |
| 2002/0156545 A1 | 10/2002 | Sekino et al. | |
| 2002/0175956 A1 | 11/2002 | Hand et al. | |
| 2003/0006991 A1 | 1/2003 | DeHaan et al. | |
| 2003/0081008 A1 | 5/2003 | Seo | |
| 2003/0097277 A1 * | 5/2003 | Miller | 705/2 |
| 2003/0149682 A1 * | 8/2003 | Earley et al. | 707/1 |
| 2003/0160826 A1 | 8/2003 | Tran et al. | |
| 2003/0169298 A1 | 9/2003 | Ording | |
| 2003/0197733 A1 | 10/2003 | Beauchamp et al. | |
| 2003/0204511 A1 | 10/2003 | Brundage et al. | |
| 2003/0210278 A1 | 11/2003 | Kyoya et al. | |
| 2003/0233365 A1 | 12/2003 | Schmit et al. | |
| 2004/0027391 A1 | 2/2004 | Tu | |
| 2004/0039625 A1 * | 2/2004 | Malnack et al. | 705/9 |
| 2004/0046797 A1 | 3/2004 | Perry | |
| 2005/0149375 A1 * | 7/2005 | Wefers | 705/9 |

OTHER PUBLICATIONS

David Lindorff, "CIO Insight", Ziff Davis Media Inc., Copyright 2002, New York: Nov. 2, 2002, vol. 1, Iss. 20, p. 34 (found via ProQuest).*

Mathwich, Brian. "Using the process map to improve your bottom line". MGMA Connexion. Englewood: Jul. 2004. vol. 4, Iss. 6. (4 pages from ProQuest).*

The Patent Office (UK), Combined Search and Examination Report under Sections 17 and 18(3), Nov. 8, 2004 (7 pages) (UK).

* cited by examiner

DOCUMENT PROCESSES OF AN ORGANIZATION

BACKGROUND OF THE INVENTION

The present invention relates to a method and system for documenting the processes of an organization. Typically such processes form a control environment enabling internal control of the organization. The present invention also relates to a method and system for embedding the control environment in an organization. The present invention finds particular utility where an organization has engaged the services of an outsourcing agency to perform certain processes on their behalf.

An organization will typically have many processes, procedures and internal controls which must be carried out during the day to day running of the organization. The different processes together form the control environment of an organization. There may be standard processes for taking on and training new staff, for example, or for more routine matters such as ordering office consumables. Many of these processes will require different members of the organization to perform different tasks: a manager may need to authorise payment for stationary ordered by a subordinate, for example. To further complicate matters, many organizations now choose to outsource various internal processes to specialist outsourcing agencies under an outsourcing engagement. The outsourcing engagement may cover only a few individual processes or may cover a substantial proportion of the control environment.

Clearly, documenting processes can be useful under some circumstances, but may be vital under others. Where there is an outsourcing engagement involved, for example, it is important to document processes to ensure that the organization and the outsourcing agency perform the tasks required of them and that there is a measure of accountability should errors occur. Furthermore, it may be a legal requirement for an organization to carefully document the processes and controls that the organization performs when managing their accounts and finances and to perform regular quality assurance reviews on their accounting practices. Auditors may require details of the processes and internal controls and, for organizations having a listing on the US stock exchange, the Sarbanes-Oxley Act places additional requirements on organizations to monitor and record their financial controls to ensure that they have internal control over their financial processes.

In the past, the processes performed by an organization may have been documented and recorded in a simple database. However, as business practices and financial law become more complex, and as questions of accountability should things go wrong become more important, the need has arisen for a more comprehensive suite of tools which permit the ongoing documentation of processes by employees of the organization and of relevant outsourcing agencies. It is also desirable to embed the control environment in the organization so that the control environment can be reviewed and edited as required. Improved communication between those documenting the processes and those carrying out the associated tasks is also important. Users and auditors should also be able to search a database record of processes and of changes to those processes and the information contained in the database should be viewable in a variety of ways either on-screen or in printed reports for improved understanding of the control environment. Embodiments of the present invention address these needs.

SUMMARY OF THE INVENTION

One aspect of the present invention provides a system for documenting processes of an organization comprising: a database storing information about processes of an organization; and a client computer adapted to receive information about a process from the database and having a user interface application thereon, the user interface application enabling the client computer to display the information about a process received from the database and enabling a user of the client computer to report via the user interface application a problem with the process.

This first aspect of the present invention addresses the technical problem of ensuring that users have access to and can report problems with the information contained in the database, something that would be important in the day to day operations of an organization. Advantageously, a user is able to use the same user interface application on their computer to both review the process and report a problem with it. This saves memory on the computer since only a single user application is required, and future software updates to computers requiring access to the database are kept to a minimum.

Preferably, the user interface application is a web browser and a server computer is adapted to format the information about a process as at least one web page and to provide said at least one web page to the client computer. This further simplifies the implementation of the present invention since client computers may typically have a web browser application installed on them already. Users will also be familiar with web browsers, so less training will be required. From a technical standpoint, this preferred embodiment enables adjustments to the look of the information presented to users at a central server level since the server computer can be adjusted to format the stored information in any desired manner without having to make any changes to the client computers accessing the database.

Preferably, the at least one web page comprises a viewing web page for viewing the information about a process and a reporting web page incorporating an electronic form for reporting a problem with the process, the viewing web page having a link to the reporting web page. Advantageously, this simplifies the process of reporting a problem with a process since a user can simply click on a link to a reporting page and fill in the electronic form presented to them. Since the link to the reporting page is on the viewing page, the electronic form can be automatically populated with information about the process for which the user wishes to report a problem based on process that the user was viewing before accessing the reporting page.

Preferably, a report of a problem with a process is stored on the database. By storing the report on the database, any person with access to the database can review the report in order to familiarise themselves with known problems with the documented processes. In particular, the user interface preferably enables a suitably authorised reviewer to approve a report of a problem with a process so that action can be taken to solve the problem. Such a reviewer may be informed when a report of a problem with a process has been made by a user by sending the receiver a message, such as an email message, automatically generated by the user interface application on the client computer of the user making the report.

Preferably, the user interface further enables an auditor to view a report of a problem with a process over a public network such as the Internet. By allowing auditors access to the database over a public network, the need for on-site auditing of the processes and controls of the organization is greatly reduced.

Preferably, the user interface further enables an administrator to modify the information about a process stored in the database. Using the same user interface application for both reviewing and editing the information contained in the database further simplifies the technical implementation of the present invention.

A second aspect of the present invention provides a method of documenting processes of an organization comprising: storing in a database information about processes of an organization; using a user interface application on a client computer to display information about a process received at the client computer from the database; and using the user interface application to report a problem with the process. Advantages and preferred features of this second aspect of the invention will be clear from the above discussion of the first aspect.

A third aspect of the present invention provides a system for documenting processes of an organization comprising: a database storing information of processes of an organization; and a client computer adapted to receive information about a process from the database and having a user interface application thereon, the user interface application enabling the client computer to display the information about a process received from the client computer and enabling a user of the client computer to request via the user interface application a change to the process. In a similar manner as with the first aspect of the present invention, this third aspect simplifies the task of requesting changes to the information stored in the database. Advantages and preferred features of this third aspect of the invention will be clear from the above discussion of the first aspect.

A fourth aspect of the present invention provides a method of documenting processes of an organization comprising: storing in a database information about processes of an organization; using a user interface application on a client computer to display information about a process received at the client computer from the database, and using the user interface application to request a change to the process. Again, advantages and preferred features of this fourth aspect of the invention will be clear from the above discussion of the first aspect.

A fifth aspect of the present invention provides a system for documenting the processes of an organization comprising: a database storing information about processes of an organization; and a client computer adapted to receive information about a process from the database and having a user interface application thereon, the user interface application enabling a client computer to display the information about a process received from the database in the form of a flowchart. A flowchart view of a process enables a user to quickly gauge the complexity of the process and assists in an overall understanding of the process.

Preferably, the flowchart includes information such as a description of the procedures making up the process, an indication of the risk associated with the process, by color coding, for example, and an indication of the persons responsible for the procedures making up the process, by placing flowchart boxes in specially designated regions or columns, for example.

A sixth aspect of the present invention provides a method of documenting the processes of an organization comprising: storing in a database information about processes of an organization; using a user interface application on a client computer to display, in the form of a flowchart, information about a process received at the client computer from the database. Advantages and preferred features of this sixth aspect of the invention will be clear from the above discussion of the fifth aspect.

A seventh aspect of the present invention provides a system for documenting processes of an organization comprising a database storing information about processes of an organization and information about financial statement categories of the organization, wherein the database associates a process with a financial statement category if the financial statement category is affected by the process. By linking processes and financial statement categories, users, and auditors in particular, are able to search the database for processes affected by one or more selected financial statement categories.

An eighth aspect of the present invention provides a method of documenting processes of an organization comprising: storing in a database information about processes of an organization; storing in a database information about financial statement categories of the organization; and associating in the database a process with a financial statement category if the financial statement category is affected by the process.

A ninth aspect of the present invention provides, a system for documenting processes of an organization comprising a database storing information about processes of an organization and document location information identifying the location of documents, wherein the database associates a process with a document location if the document at the document location relates to the process. By linking processes with related documents, users are able to quickly locate documents that might aid them in carrying out a process. For example, the documents could relate to Sarbanes-Oxley requirements for the process, or may describe the process in greater detail.

Preferably, a client computer adapted to receive information about a process from the database and having a user interface application thereon can display a list of the or each document relating to the process, the list including a link to the document at the document location for the or each document in the list. By presenting such a list to a user, the user is able to access the documents directly through the user interface application.

A tenth aspect of the present invention provides a method of documenting processes of an organization comprising: storing in a database information about processes on an organization; storing in a database document location information identifying the location of documents; and associating in the database a process with a document location if the document at the document location relates to the process. Advantages and preferred features of this tenth aspect of the invention will be clear from the above discussion of the ninth aspect.

Another embodiment of the present invention provides a system for documenting processes and controls of an organization comprising: a database storing information describing processes of an organization, each process comprising at least one procedure to be followed when carrying out the process and any controls associated with the or each procedure; and a client computer adapted to receive information describing a process from the database and having a user interface application thereon, the user interface application adapted to display the information describing the process and enabling a user to prepare a report about a problem with the process and to save the report to the database. Preferably the user interface application is a web browser and the client computer is adapted to receive the information describing a process formatted as at least one web page. Preferably, a reviewer is informed by an email automatically generated by the user interface application when a report about a problem with a process has been saved to the database.

A yet further embodiment of the present invention provides a method of documenting processes and controls of an organization comprising: storing in a database information describing processes of an organization, each process comprising at least one procedure to be followed when carrying out the process and any controls associated with the or each procedure; using a user interface application on a client computer to display information describing a process received at the client computer from the database; using the user interface application to prepare a report about a problem with the process; and using the user interface to save the report to the database. Preferably, the user interface application is a web browser application and the method further comprises: formatting the information describing a process as at least one web page; and providing the at least one web page to the client computer. Preferably, the method further comprises informing a reviewer when a report about a problem with a process has been saved to the database by: opening an email application on the client computer; automatically generating an email message to the reviewer informing him that a report about a problem with a process has been saved to the database; and sending the email message to the reviewer with the email application.

Another embodiment provides a system for documenting processes and controls of an organization comprising: a database storing information describing processes of an organization, each process comprising at least one procedure to be followed when carrying out the process and any controls associated with the or each procedure; and a client computer adapted to receive information describing a process from the database and having a user interface application thereon, the user interface application adapted to display the information describing the process and enabling a user to prepare a request for a change to the process and to save the request to the database.

A still further embodiment provides a method of documenting processes and controls of an organization comprising: storing in a database information describing processes of an organization, each process comprising at least one procedure to be followed when carrying out the process and any controls associated with the or each procedure; using a user interface application on a client computer to display information describing a process received at the client computer from the database; using the user interface application to prepare a request for a change to the process; and using the user interface to save the request to the database.

In another embodiment, the present invention provides a system for documenting the processes and controls of an organization comprising: a database storing information describing processes of an organization, each process comprising a plurality of procedures to be followed when carrying out the process and any controls associated with each procedure; and a client computer adapted to receive information describing a process from the database and having a user interface application thereon, the user interface application enabling a client computer to display the information describing a process received from the database in the form of a flowchart comprising a plurality of boxes each associated with a procedure of the process. Preferably, the boxes are arranged in the flowchart in an order corresponding to an order in which the procedures of a process are to be followed when carrying out the process. Preferably, each box contains a description of the associated procedure. Preferably, the flowchart is divided into one or more regions (columns, for example), each region associated with a person responsible for one or more of the procedures of the process, and the boxes are positioned in the flowchart in the region corresponding to the person responsible for the associated procedure. Preferably, each box includes an indication of a risk amount of the associated procedure, the risk amount for each procedure corresponding to a risk amount of any controls associated with that procedure. Preferably, each box is color coded according to the risk amount of the associated procedure.

Another preferred embodiment provides a method of documenting the processes and controls of an organization comprising: storing in a database information describing processes of an organization, each process comprising a plurality of procedures to be followed when carrying out the process and any controls associated with each procedure; providing information describing a process to a client computer having a user interface application thereon; and using the user interface application to display the information describing the process in the form of a flowchart comprising a plurality of boxes each associated with a procedure of the process.

Yet another preferred embodiment provides a system for documenting processes and controls of an organization comprising a database storing information describing processes and controls of an organization and information about financial statement categories of the organization, wherein a process is linked with a financial statement category in the database if the financial statement category is affected by the process.

In another preferred embodiment, there is provided a method of documenting processes and controls of an organization comprising: storing in a database information describing processes and controls of an organization; storing in a database information about financial statement categories of the organization; and linking a process with a financial statement category in the database if the financial statement category is affected by the process.

Another embodiment provides a system for documenting processes and controls of an organization comprising a database storing information describing processes and controls of an organization and document location information identifying the location of documents on a network, wherein a process is linked with a document location in the database if the document at the document location relates to the process.

A further embodiment provides a method of documenting processes and controls of an organization comprising: storing in a database information about processes and controls of an organization; storing in the database document location information identifying the location of documents; and linking a process with a document location in the database if the document at the document location relates to the process.

Another embodiment of the present invention provides a system for documenting the processes and controls of an organization, comprising: a database storing information describing the processes and controls of an organization; and a web server computer in communication with the database for receiving information from the database and for formatting that information as a series of web pages, the web pages including: a web page for displaying information about a selected process of the organization and including a link to a list of documents relating to the selected process and a link to a list of financial statement categories affected by the process; a web page for displaying information describing a selected process in the form of a flowchart; a web page for enabling a user to prepare a report of a problem with a selected process; and a web page for enabling a user to request a change to a selected process.

Although each of the above aspects and preferred embodiments of the present invention have been discussed individually, it will be understood that the features of each aspect or embodiment may be combined in many different ways. The particular combinations of features described above should therefore not be taken as placing any limits on the potential scope of the invention since it would be apparent to a skilled person that different combinations of these features would result in embodiments which nevertheless provide the desired advantages.

Additional features and advantages of the present invention will become apparent from the following more detailed description.

BRIEF DESCRIPTION OF THE DRAWINGS

A preferred embodiment of the present invention will now be described by way of an example and with reference to the accompanying drawings in which:

FIG. 2 illustrates a template spreadsheet for recording details of a process;

FIG. 5 shows a list of documents associated with a control sheet;

FIG. 7 shows a quick search screen for searching the database;

FIG. 8 shows an advanced search screen for searching the database;

FIG. 11 shows an electronic form for reporting errors or control exceptions that have occurred;

DETAILED DESCRIPTION OF THE INVENTION

Generally speaking, embodiments of the present invention provide a database for documenting processes and controls of an organization as a manual of control sheets. Embodiments of the present invention also provide a suite of tools for accessing and updating the database and viewing the control sheets. The database embodying the present invention is referred to as a quality control database (QCD) since it may be used when performing quality control or quality assurance reviews on the processes and controls that an organization uses in its day to day operations.

Another function of the QCD is to inform employees of an organization or of an outsourcing agency of the tasks that they are required to perform as part of their work. As an example, an employee distributing mail received by an organization might wish to know which department or person should receive an invoice. The employee would search the QCD for processes relating to "invoices" to find the control sheet documenting the appropriate process. From the control sheet, the employee would learn that the invoice should be passed to a particular person in the accounts department. The accounts employee could themselves review the QCD to ascertain how they should deal with the invoice and whether authorization to pay the invoice is required by a supervisor. An experienced employee would not find it necessary to review the relevant control sheet on the QCD for every task that they perform, but for a new employee the QCD would serve as a valuable training tool. If a particular process is being outsourced, the value of the QCD as a training tool is increased since an outsourcing agent will require less on-site training, if any. The QCD also facilitates standardization and promotes best practices in terms of the processes carried out by an organization.

Another function of the QCD is to permit managers to review the processes being carried out by their organization. Managers will therefore have greater awareness of the way their organization is operating and will be able to make or suggest changes to improve the running of their organization. Employee suggestions for changes to processes may also be made and reviewed more easily since the control environment is clearly defined.

A further function of the QCD is to permit auditors monitoring the operations of an organization to do so quickly and easily. Auditors may be able to access the QCD from their own office over a network such as the Internet, reducing the need for an on-site presence.

Figure 1:
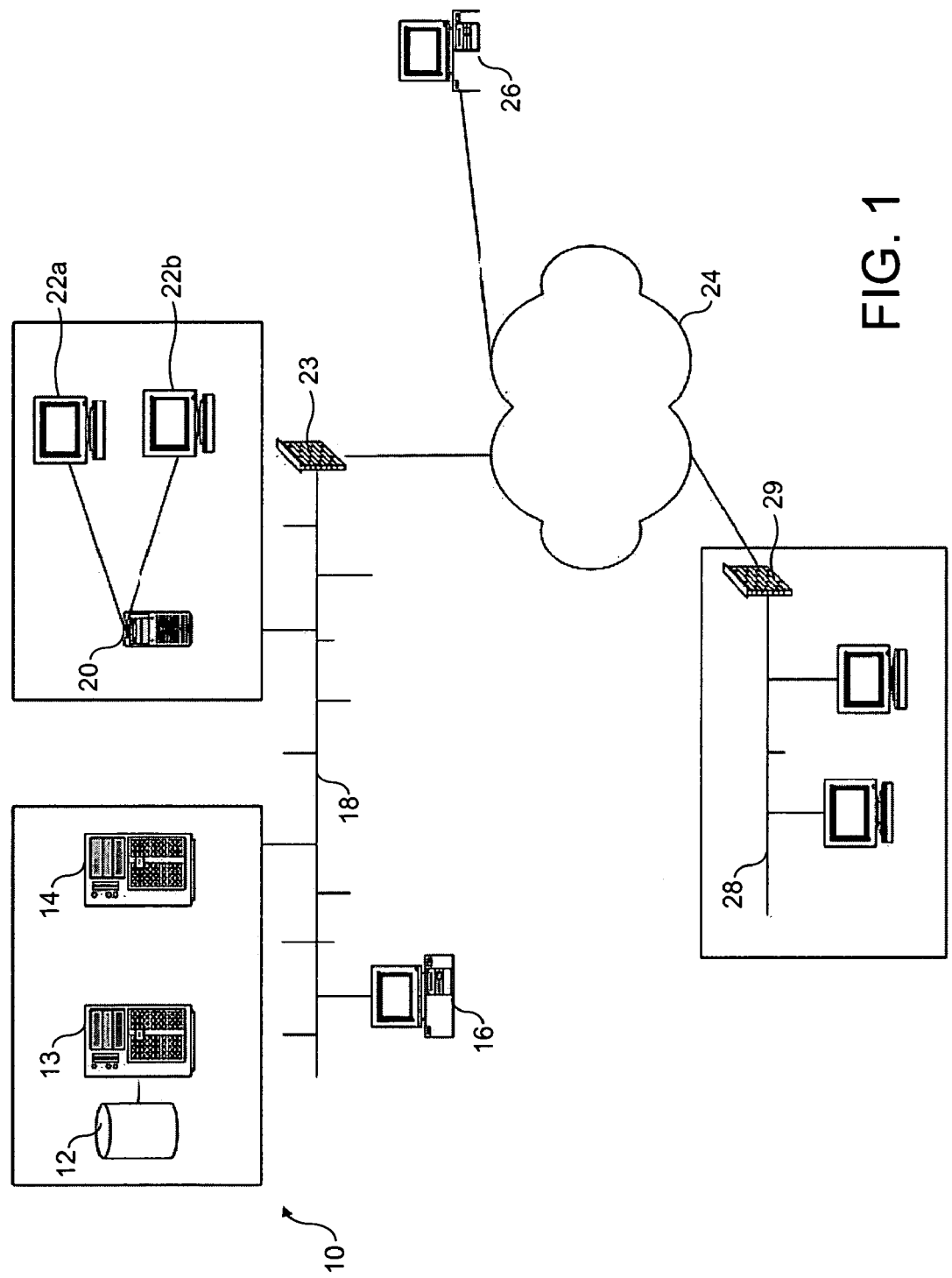
FIG. 1 shows a database for storing the documented processes of an organization and some of the different connection methods that may be used to access the database.

FIG. 1 illustrates a network of computers that may be used to access a quality control database (QCD) embodying the present invention. The QCD system 10 comprises a database 12 on a database server computer 13 and a web server computer 14 connected to the database server computer 13. The database 12 is used to store the documented process of an organization and any other related information that may be desired. The web server computer 14 manages data flow between the database 12 and user computer systems. The QCD system 10 may be maintained by an organization, in which case the database 12 will typically store only the documented processes of that organization. Alternatively, the QCD system 10 may be maintained by an outsourcing agency, in which case the database 12 will most likely store the documented processes of several different organizations.

Users will typically access the database 12 using a client computer having suitable user interface software installed onto it. Preferably, the user interface software is a web browser application of the sort commonly installed on personal computers and the data on the database 12 is formatted as one or more web pages by the web server computer 14. These web pages are then viewed using the web browser software once the client computer has downloaded the web pages from the web server computer 14. Advantageously, therefore, the client computers will typically not require any specialised software to be able to access the database 12. Client computers may be a local client computer 16 having a connection to the web server computer 14 via a local area network (LAN) 18. Alternatively, the web server computer 14 may receive information requests via a thin client server computer 20 connected to the web server computer 14 over the LAN 18. These requests can be made by one or more client workstation computers 22a, 22b connected to the thin client server computer 20. The web server computer 14 may also be connected through a firewall 23 to a public wide area network (WAN) 24 such as the Internet. In this way, an individual remote client computer 26 can connect to and communicate with the web server computer 14 over the public WAN 24. Alternatively a remote LAN server 28 can connect to the web server computer 14 through a firewall 29 over the public WAN 24, permitting remote client computers 32*a*, 32*b* connected to the LAN 28 to send data requests to the web server computer 14. Other communication methods may be used, such as wireless communications, and FIG. 1 is intended only to be illustrative of some of the common ways in which client computers may access the quality control database 12.

To ensure the security of the information contained in the database 12, a client computer is typically only able to access the database 12 following suitable security checks. For example, the first web page provided by the web server computer 14 to a client computer may prompt the user to enter a username and password. Where the QCD system 10 is maintained by an organization, a particular username and password combination may be associated with permission to access only certain records and to receive certain pages of data from the web server computer 14. For example, a manager of an organization may be able to review all of the documented processes stored in the database 12. A subordinate worker, on the other hand, may be able to access only a few of the processes of the organization, such as those processes for which that worker is directly responsible. Other users may be provided with permission to access web pages which permit them to amend the information stored in the database 12.

If the QCD system 10 is maintained by an outsourcing agency then, as mentioned above, the database 12 will typically store the documented processes of several different organizations. An employee of one organization will typically not be able to access the stored documented processes of any other organization. However, employees of the outsourcing agency may be able to view a wide range of different processes in order to perform the different outsourcing tasks allocated to them.

Developing a quality control database 12 requires a number of different stages. The first stage is to compile a list of processes that are to be included in the database 12. Typically, the database 12 should be used to document only the significant processes of an organization, although as many or as few processes as are required may be documented. Where a process or group of processes is being outsourced to an outsourcing agency, the outsourcing engagement or contract may be used to determine which processes should be documented to ensure that the outsourcing agency provides the required level of service.

The second stage to creating the database 12 is to categorise the processes in order to determine a suitable database structure and index. In general, any suitable structure may be used. However, it has been found that a three level structure makes navigation easy while nevertheless providing sufficient flexibility in the way the database is formed. The first two levels of the three level structure may be any suitable categorization or indexing system. For example, the database structure may be developed based on a departmental structure of the organization or the database structure may be process goal oriented. Other considerations may be whether certain processes are standard across departments or countries, and whether there are different language requirements for different departments in a multinational organization. The third level, or process level, lists the actual processes that are being documented.

By way of an example only, a first or top level to the database structure for storing a number of financial processes may include the following general categories: "Prepare and Monitor Budgets and Forecasts", "Maintenance of Master Data", "Process and Account for Income", "Tax and Government Agency Information", "Period End Accounting", and "Process and Account for Expenditure". Each of these general first level categories is then subdivided into a number of more specific second level categories. Under the first level category of "Process and Account for Expenditure", for example, the second level may include the following categories: "Process Payments", "Allocate Costs", "Account for Stock", "Commitment Documentation" and "Process Invoices". Each of the more specific second level categories is then subdivided into a number of actual processes that are to be performed. For example, under the second level category of "Process Invoices", for example, the process level may include the following processes: "Receipt and Scanning of Invoices", "Processing Services Invoices", "Processing No-Paperwork Invoices", "Auto-Approval of Invoices", "Contract Compliance", and "Payment Proposal".

This three level structure of processes forms a manual for the organization. It may be convenient for large or multinational organizations to document their processes in several manuals. An outsourcing agency will typically store individual manuals on their database 12 for each of their client organizations.

A third stage to creating the database 12 involves establishing the resource requirements for the QCD system 10. These may be hardware or software requirements of the database server computer 14 or of client computers that are to be used to access the database 12. For example, it may be required to install user interface software, such as an up-to-date web browser application, on all of the computers of an organization so that employees of the organization can access the database 12. Resource requirements also include human resource requirements such as the workers who will be involved in creating and maintaining the database. Typically, a project co-ordinator will be required to oversee the whole process. A decision should also be made at this stage as to who will be documenting the processes based on the compiled list of processes that require documentation. This could be a single person or group dedicated to document all processes and controls, or responsibility could be devolved to team leaders or process owners to document their own processes. A quality assurance leader may also be required to ensure accurate documentation. One or more database administrators should be identified who will be given permission to edit and change the database in order to correct mistakes or to reflect changes in processes as an organization develops. Preferably, there will be a maximum of two such administrators so that there is cover should one administrator be absent, while nevertheless placing a limit on the number of people with administrative control. A number of "super-users" should also be identified who, due to their familiarity with the database or with the documented processes, would be able to provide training and assistance.

A fourth stage to creating the database 12 involves the actual documenting and recording of the processes based on the previously compiled list of processes. At this stage it is necessary to break each process down into a series of steps or operating procedures to be carried out when performing the process. The operating procedures will typically be only the high-level procedures required when carrying out a process and will not include full details of every single step in the process. The operating procedures are further broken down, where necessary, into actions, tasks or control techniques which are carried out to ensure that the objectives of the operating procedure are met and that the operating procedure has the necessary integrity and is of the appropriate quality. A control technique may describe a way of double-checking the actions of a worker, for example, or of segregating the duties within a process.

Figure 2:
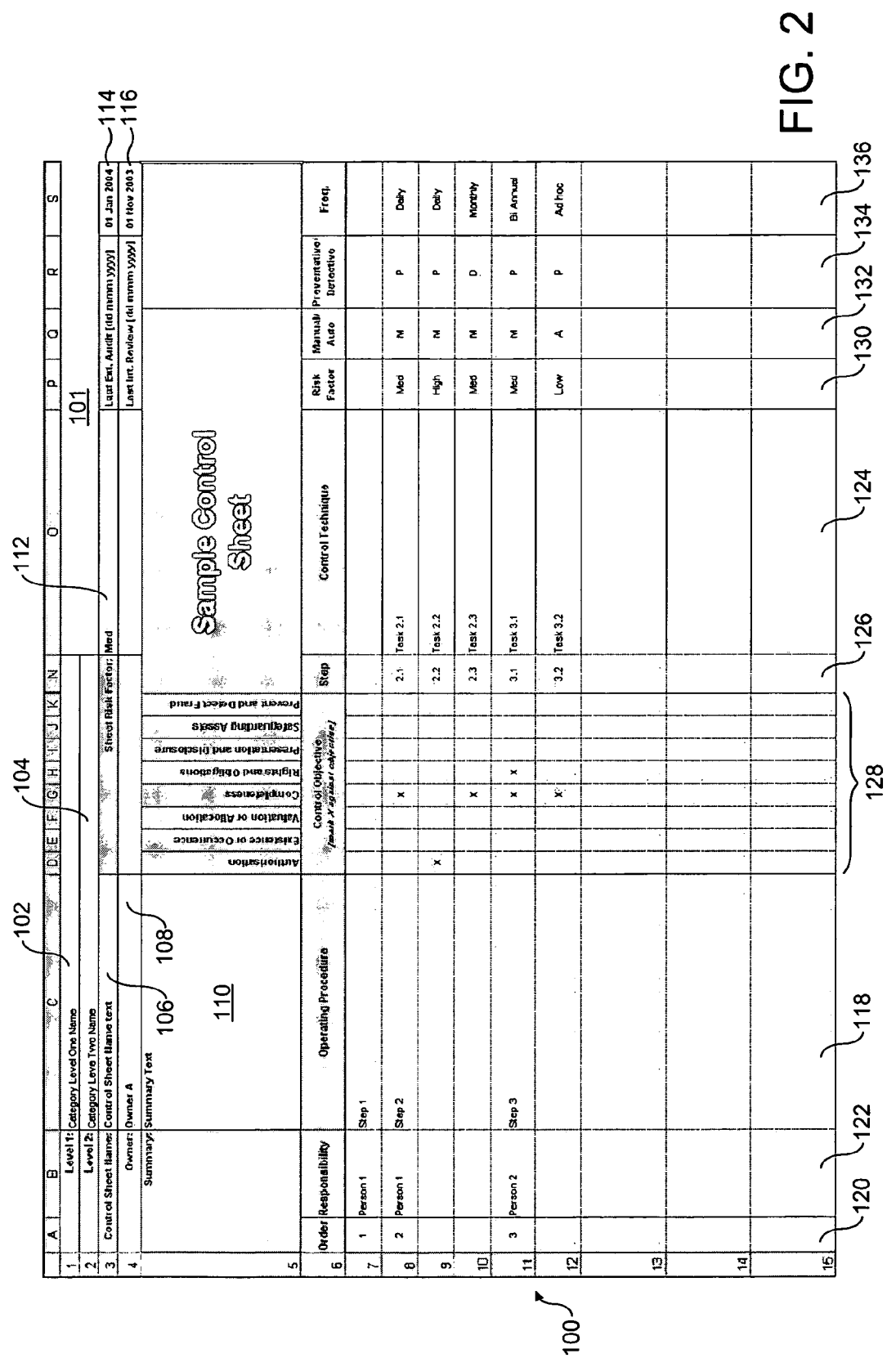

The operating procedures and control techniques for each process are recorded in any suitable manner. For example, the procedures and techniques may be entered into a spreadsheet such as that illustrated in FIG. 2 together with other pertinent data. The spreadsheet 100 shown in FIG. 2 is a template spreadsheet or a control sheet template which receives detailed information about a single process. One advantage of using a standard template spreadsheet 100 is that the data may then be automatically extracted from the spreadsheet for storing in the database 12. This saves time and reduces the likelihood of data entry errors.

The exemplary template spreadsheet 100 in FIG. 2 includes a number of cells for receiving data to identify the process uniquely and to provide other related information. The organization name cell 101 receives the name of the organization carrying out the process being documented, or the organization from where the process has been outsourced to an outsourcing agency. A first level name cell 102 receives the first level categorization name for the process being documented, as previously determined when compiling the list of processes. A second level name cell 104 receives the previously determined second level categorization name for the process being documented. A control sheet name cell 106 receives the previously determined name of the process being documented. Typically, the spreadsheet will be saved to disk using this name so that it can be located easily at a later stage. An owner name cell 108 receives the name of the department or manager who is responsible for the process being documented (the "process owner"). The summary cell 110 receives a description, preferably a brief summary, of the process being documented. The sheet risk factor cell 112 receives an indication of the risk associated with the process being documented. The possible indicators of "Low", "Medium" or "High" may be selectable from a drop down menu programmed into the template spreadsheet 100. Risk will be discussed in more detail below in conjunction with FIG. 3. The last external audit cell 114 receives a date when the process was last audited by an external auditor. The last internal review cell 116 contains a date when the process was last reviewed internally.

The example spreadsheet 100 in FIG. 2 also includes a number of cells for recording details of the operating procedures and of any control techniques which make up the process. The operating procedure cells 118 receive a list of the steps or operating procedures involved in carrying out the process being documented. These procedures may be event orientated or goal orientated, for example, but any suitable series of steps may be entered. Three operating procedures are shown in FIG. 2, but a process may have fewer or more than this as desired. The order cells 120 are used to number the different steps entered in the operating procedure cells 118 sequentially. The responsibility cells 122 receive data identifying an individual, department or organization (referred to generally as a "person") responsible for the operating procedure listed in the adjacent operating procedure cell 118. Where a process is being outsourced, responsibility for some procedures may rest with the organization and other procedures will be the responsibility of the outsourcing agency. Preferably, a standard format should be used when entering the name of the person responsible to ensure consistency within the spreadsheet 100 and between different spreadsheets. A drop down menu programmed into the template spreadsheet 100 may provide a list of responsible persons from which the appropriate person can be selected to ensure that a standard format is used.

The control technique cells 124 receive a list of the actions, tasks or control techniques to be performed in order to ensure that an associated operating procedure is completed correctly. As shown in FIG. 2, not all operating procedures require associated control techniques. The step cells 126 are used to number the control techniques entered in the control technique cells 124 sequentially. Preferably the control techniques are numbered to indicate the number of the control technique within each operating procedure using the form (operating procedure number)·(control technique number). In this manner, the third control technique of the second operating procedure would be numbered "2.3".

Each control technique will have one or more control objectives associated with it. The control objectives explain the purpose of performing a control technique. The preferred control objectives used in the spreadsheet 100 illustrated in FIG. 2 are "Authorization", "Existence or Occurrence", "Valuation or Allocation", "Completeness", "Rights and Obligations", "Presentation and Disclosure", "Safeguarding Assets", "Prevent and Detect Fraud". The objective of "Authorization" is to ensure that all relevant transactions and activities are approved at the appropriate level in accordance with management criteria. The objective of "Existence or Occurrence" is to ensure that items in an account or transaction class actually have occurred or exist. The objective of "Valuation or Allocation" is to ensure that items in an account or transaction class have been valued at the correct amount and have been properly summarised. The objective of "Completeness" is to ensure that all transactions that should be included in an account or transaction class have been included. The objective of "Rights and Obligations" is to ensure that only those items for which the company has a legal right have been included in asset accounts and only those items for which the company has a legal obligation have been included in the liability accounts. The objective of "Presentation and Disclosure" is to ensure that all items included in the financial statements have been properly classified and disclosed. The objective of "Safeguarding Assets" is to safeguard against any of: the understatement of sales through failure to prepare invoices or through incorrect pricing or computation; making overpayments to vendors or employees arising from inaccuracies in quantities of materials or service, prices or rates, or computations; the physical loss or misappropriation of assets such as cash, securities, or inventory; and the improper allocation of certain costs, which would result in failure to recover these costs from customers. This objective is also to ensure that access to input/approve data held in systems is segregated and restricted to authorised personnel and that access to cash is restricted to authorised personnel. The objective of "Prevent and Detect Fraud" is to identify and stop intentional deception or misrepresentation regarding financial statement items and disclosure, and to prevent, deter and detect fraud throughout the organization that would impact the company's financial statements. With the exception of "Authorization", these control objectives are the widely recognised set of control objectives suggested by the Committee of Sponsoring Organizations (COSO) and will therefore be familiar to experienced business people. The control objective cells 128 receive an "X" or other suitable character which serves to cross-reference each control technique against one or more associated control objectives.

The technique risk factor cells 130 each receive an indication of the risk associated with the particular control technique. The preferred risk indicators of "Low", "Med" or "High" may be selectable from a drop down menu programmed into the template spreadsheet 100. Risk will be discussed in more detail below in conjunction with FIG. 3. The manual/auto cells 132 receive an indication of whether the associated control technique is performed manually or automatically. The possible indicators of "M" or "A" may be selectable from a drop down menu programmed into the template spreadsheet 100. The preventative/detective cells 134 receive an indication of whether the associated control technique is intended to detect problems when carrying out a procedure, or to prevent them. The possible indicators of "P" or "D" may be selectable from a drop down menu programmed into the template spreadsheet 100. The frequency cells 136 receive an indication of the frequency with which the associated control technique is to be performed. Suitable frequencies such as "Daily", "Weekly", "Monthly", "Ad Hoc" and so forth may be selectable from a drop down menu programmed into the template spreadsheet 100.

Other information relating to the process being documented may also be recorded in the spreadsheet 100, or in some other way. For example, the location on a computer network of electronically stored documentation relating to the process may be recorded. This documentation may include help files, user manuals explaining in detail each of the operating procedures or control techniques, and financial documents required by auditors or accountants. Any control objectives other than the standard group can also be recorded if desired. In a particularly preferred embodiment, a person filling in a template spreadsheet 100 will be permitted to input a list of financial statement categories which are affected by the process. For example, the process may affect a "Gross Sales" financial statement category and this fact can be recorded against the process spreadsheet 100. This is particularly useful where an organization has a US stock exchange listing since it is common for auditors in the US to require a list of financial statement categories and the processes of an organization that might affect those categories.

Figure 3:
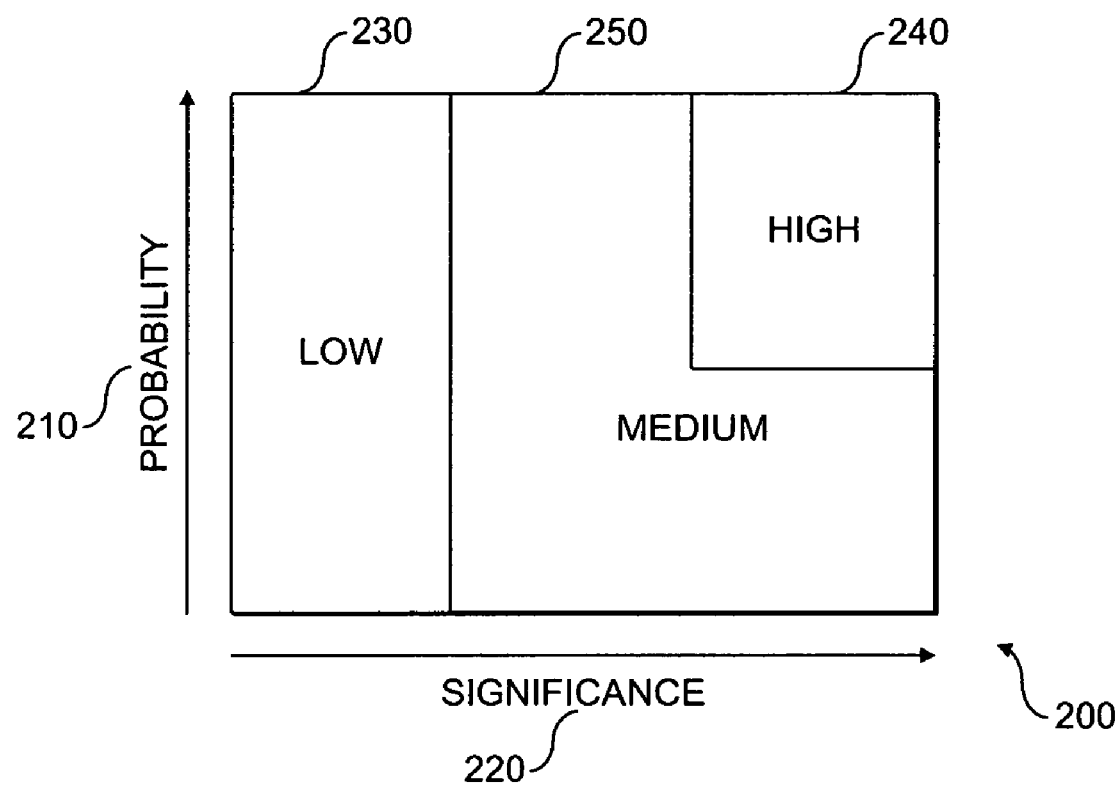
FIG. 3 is a graph used when assessing the risk associated with performing a process or a control technique associated with the process.

FIG. 3 shows a graph 200 which is preferably used when estimating the risk factor associated with a process or a control technique. This risk is then entered in the sheet risk factor cell 112 or in the individual technique risk factor cells 130. The graph has a vertical axis of probability 210 running from low probability to high probability from bottom to top, and a horizontal axis of significance 220 running from low significance to high significance from left to right. Probability relates to the probability that a particular process or control technique might fail. For example, if it would be easy for a worker to make a mistake when performing a control technique, then the probability of failure for that technique would be high. Significance relates to the significance of the fact if a process or control technique does fail. For example, if the result of a process failing to operate correctly would be a small delay in completing a non-urgent matter, than the significance of failure for that process would be low. Referring to the graph 200 shown in FIG. 3, where it is of low significance should a process or technique fail then the total risk of the process or technique will be low 230, no matter how probable that failure might be. However, where a process/technique has both a high probability of failure and such a failure would have a high significance, the risk factor of that process/technique would be high 240. In all other cases, the risk factor is considered to be medium 250.

A fifth stage to creating the database 12 involves reviewing the documented processes to ensure that they are accurate and reflect the current processes of the organization. This stage can be used to ensure that there is clarity in what is being done, when it is to be done, how it is evidenced, and who is responsible. The review stage also provides an organization with the opportunity to challenge existing processes and to consider whether they are appropriate and effective. Additional control techniques may be developed which would ensure that operating procedures are carried out correctly and with an acceptable level of internal control.

A sixth stage to creating the database 12 involves storing the documented processes on the database 12 as one or more manuals of control sheets. The data can be uploaded automatically if a template spreadsheet 100 such as the one shown in FIG. 2 has been used to document the processes. Alternatively, data can be entered into the database manually from the documented processes. If the data is uploaded manually, then further quality assurance checks would typically be made to ensure the integrity of the data. If a single database 12 is being used to store the processes of several different organizations, the recorded processes will be separated into different manuals, typically one for each organization. A large organization may, however, find it useful to separate their own processes into a number of different manuals.

A seventh and final stage to creating the database 12 involves testing the QCD system 10. This ensures that the integrity of the data and credibility of the application are maintained.

The database 12 will now be ready to use. However, an organization will most likely wish to arrange an internal launch including emails, team meetings and so forth to prepare employees for the change. It may also be useful to distribute laminated cards showing the database structure. This creates visibility for the QCD system 10 and provides users with an easy guide to the structure of the database 12 so that they know where to find specific processes. Training would also normally be provided to users regarding the purpose of the QCD system 10, its importance in documenting the control environment and its functionality. More detailed training would be required for the administrators who have previously been selected and who will be responsible for maintenance of the QCD system 10. Once the training and preparation have been completed, the QCD system 10 can "Go Live".

Once the system 10 is live, users are able to access the database 12 using user interface software installed on their computer, such as a web browser application, and to view the documented processes. FIGS. 4 to 20 show screenshots 300 of web pages generated by a preferred embodiment of the present invention.

Figure 4:
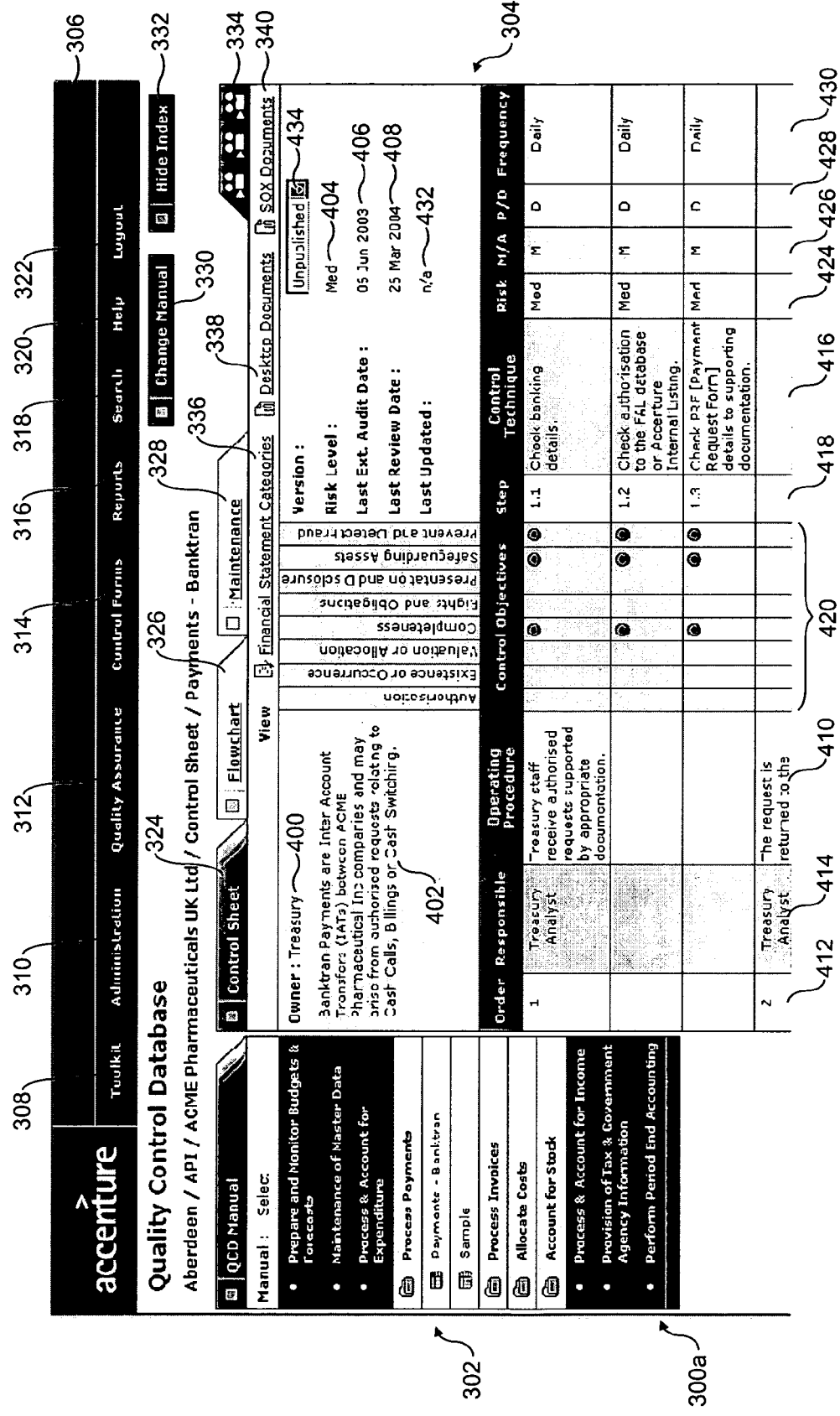
FIG. 4 shows an example control sheet describing the documented details of a process.

The control sheet screen 300a shown in FIG. 4 is used to display details of a selected process. The control sheet screen 300a includes a manual navigation pane 302 allowing a user to navigate between the documented processes stored on the database for a selected manual and a control sheet display area 304 displaying the recorded details of a selected process including the operating procedures, associated control techniques and other related items of information that were previously documented when creating the database 12. The information concerning the process displayed in the control sheet display area 304 includes the name of the process owner 400, the summary of the process 402, the risk level of the process 404, the last external audit date 406 (if applicable), the last internal review date 408 (if applicable), the description of each operating procedure 410, the step number 412 of the operating procedures, the responsible person 414 for each operating procedure, any control techniques 416 associated with the control procedure, the action number 418 of the control technique, an indication of the core control objectives and of any custom control objectives 420 of each control technique, and the risk factor 424, manual/automatic indicator 426, preventative/detective indicator 428 and frequency 430 of each control technique, all of which are described above in connection with the fourth stage of creating the database 12. Also displayed is a date 432 on which any of the stored details of process were last updated in the database 12 (if applicable) and the version number 434 of the displayed data if there is more than one version due to previous updates. Users can use the drop down menu adjacent the version number 434 to select the version they wish to view.

A menu bar 306 at the top of the screen 300a allows a user to access different web pages on the web server 14 which may provide different information or various user functions. The menu bar includes a toolkit menu 308 from which a user can access different pages for navigating through and viewing the records in the database 12, an administration menu 310 which is only visible to users with administrator access privileges and from which a user can access pages used to edit and update the database, a quality assurance menu 312 which is only visible to users with quality assurance privileges and from which a user can access pages used to review reports of problems with a documented process or requests for changes to a control sheet, a control forms menu 314 from which a user can access pages used to report problems with a documented process or to request changes to a control sheet, a reports menu 316 which is only visible to users with reporting privileges and from which a user can access pages used to generate reports based on the contents of the database 12, a search menu 318 from which a user can access pages used to search the database 12, a help menu 320 from which a user can access help pages and a logout button 322 to log the user out of the system.

Figure 5:
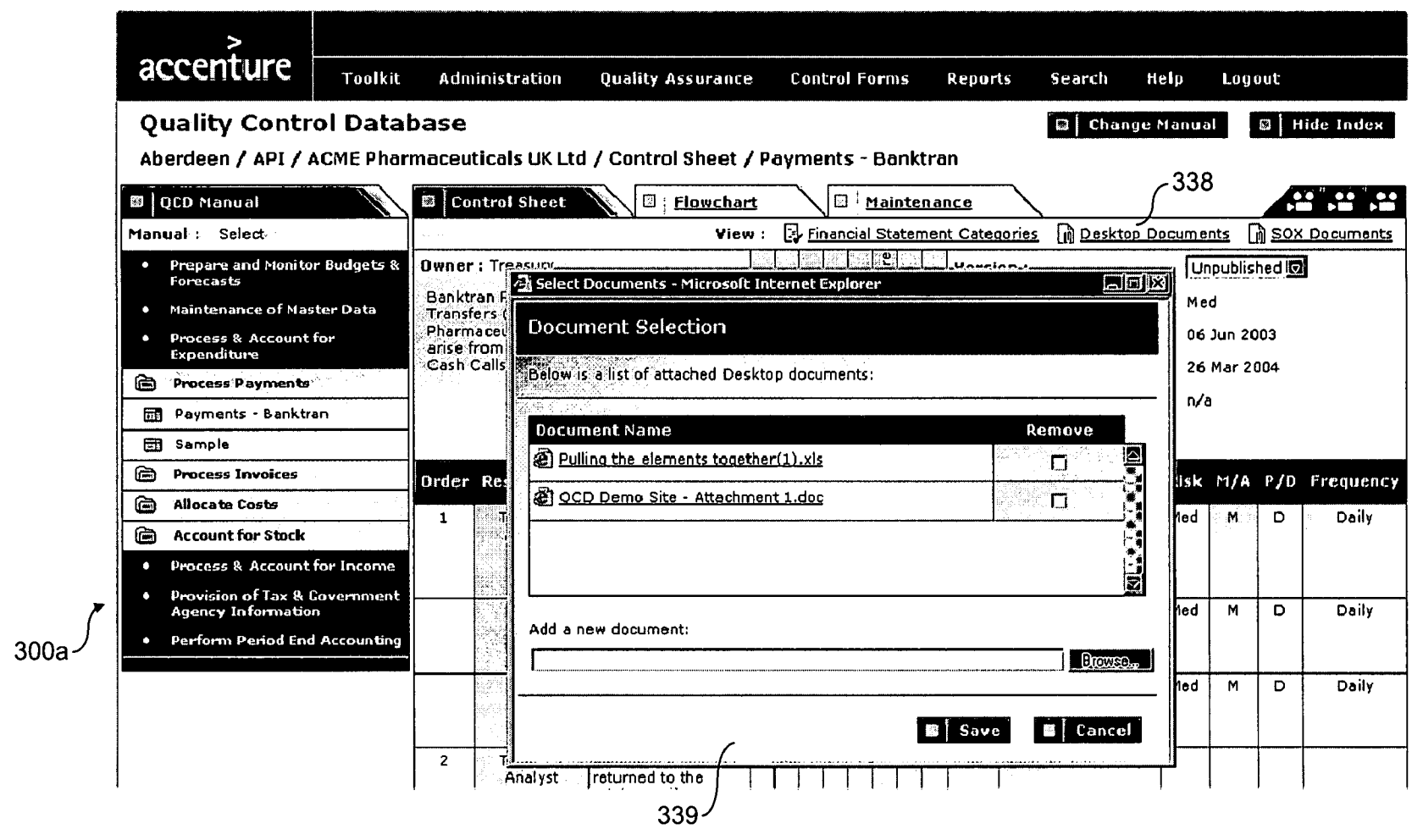

The control sheet screen 300a also includes a number of buttons and tabs which permit the user to access commonly used pages quickly without using the menus on the menu bar 306. The control sheet tab 324 is highlighted to illustrate that the control sheet 304 is being displayed. Clicking the flowchart tab 326 takes the user to a flowchart view of the selected process which will be described below in conjunction with FIG. 6. Clicking on the maintenance tab 328, which is only visible to users with administrator privileges, takes the user to a maintenance view of the selected process which will be described below in conjunction with FIG. 17. Clicking the change manual button 330 brings up a menu allowing the user to view a different manual in the database 12, provided that the user has the appropriate privileges to access that manual, or after the user has entered a suitable username and password for the new manual. Clicking the hide index button 332 hides the manual navigation pane 302. Clicking on any of the help buttons 334 provides a user with help on the web page displayed at the time, preferably in the form of a screen-captured walkthrough. Clicking on the financial statement categories tab 336 brings up a list of the financial statement categories that are affected by the selected process. Clicking on the desktop documents button 338 brings up a hyperlinked list 339, as shown in FIG. 5, of electronically stored documents which relate to the selected process. A user can access any of the stored documents directly by selecting them from list 339. In a similar manner, clicking on the SOX documents button 340 brings up a hyperlinked list of electronically stored documents which relate to the Sarbanes-Oxley requirements of the selected process. A user can access any of the stored documents directly by selecting them from the list.

Figure 6:
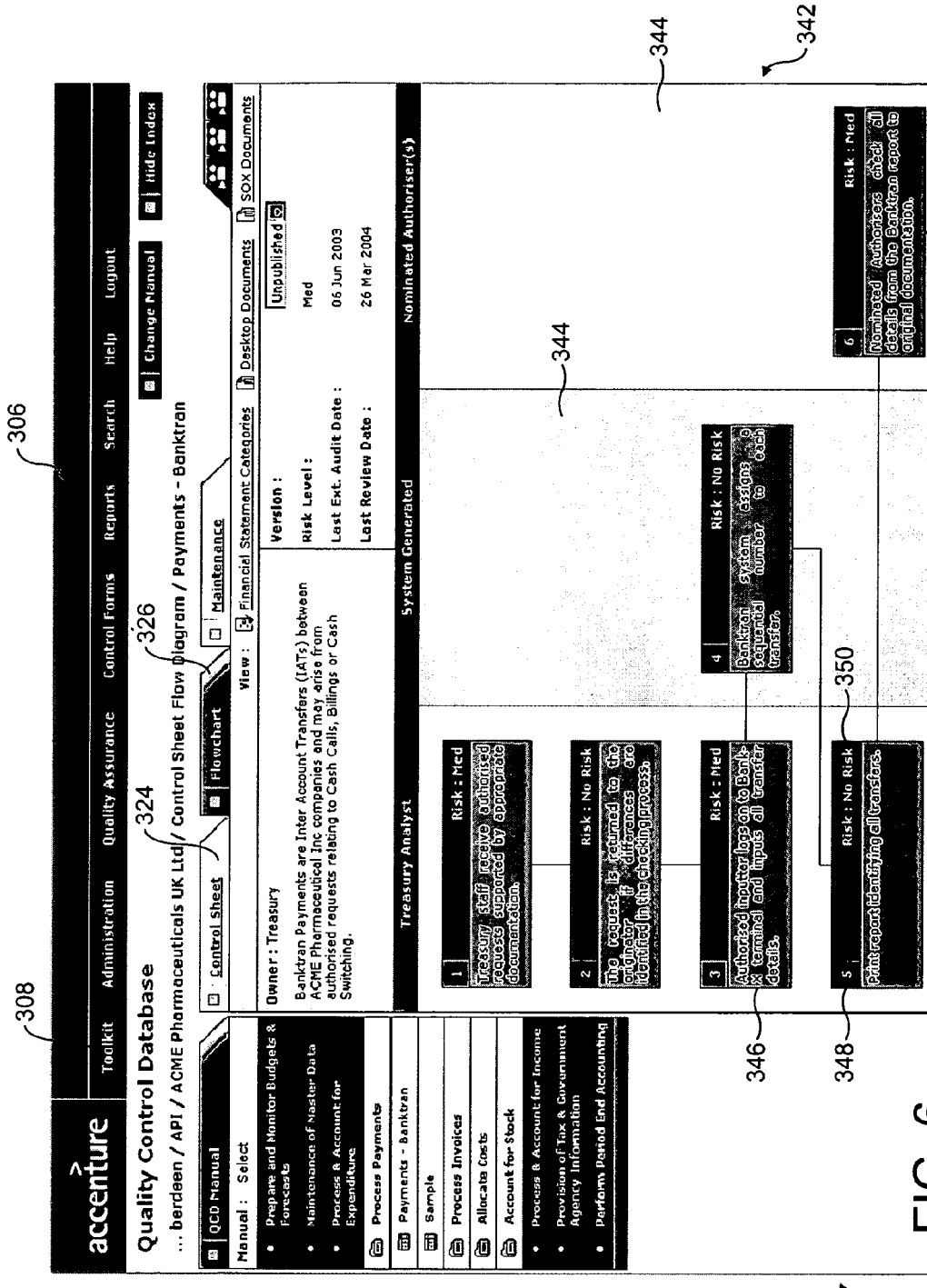
FIG. 6 shows a flow chart view of a process.

FIG. 6 shows a flowchart screen 300b for displaying a selected process in a more visually striking way. The flowchart screen 300b is displayed when the user clicks the flowchart tab 326 or selects a flowchart view from the toolkit menu 308 in the menu bar 306. The flowchart screen 300b includes a flowchart display area 342 which displays the operating procedures of the selected process in the form of a flowchart or swimlane generated automatically from the data stored in the database 12. The flowchart display area 342 is split into regions 344, preferably columns, each region corresponding to a responsible person for the selected process. The stored text describing each operating procedure of the selected process is printed inside a box 346 and each box is positioned in the appropriate region 344 depending upon the person responsible for the associated procedure. Each box is numbered 348 with the step number of the operating procedure and the boxes are arranged in numerical order in the flowchart display area 342 with lines drawn to connect the boxes sequentially in the order that the operating procedures are performed. Each box 346 also indicates the risk 350 associated with the operating procedure. The risk of an operating procedure is determined based upon the risk of any control techniques associated with the procedure. If a procedure has no control techniques, then the associated risk will be "none" or "no risk". If a procedure has a single control technique, the risk associated with that technique will be considered to be the risk of the procedure. If a procedure has more than one control technique, the risk factor of the control technique having the greatest risk will be displayed as representative of the overall risk of the procedure. The number 348 of the procedure is color coded according to the risk level with red, amber, green and blue indicating high, medium, low or no risk, respectively. The flowchart view therefore provides users with a summary of a process and an overall impression of the complexity of the process.

Figure 7:
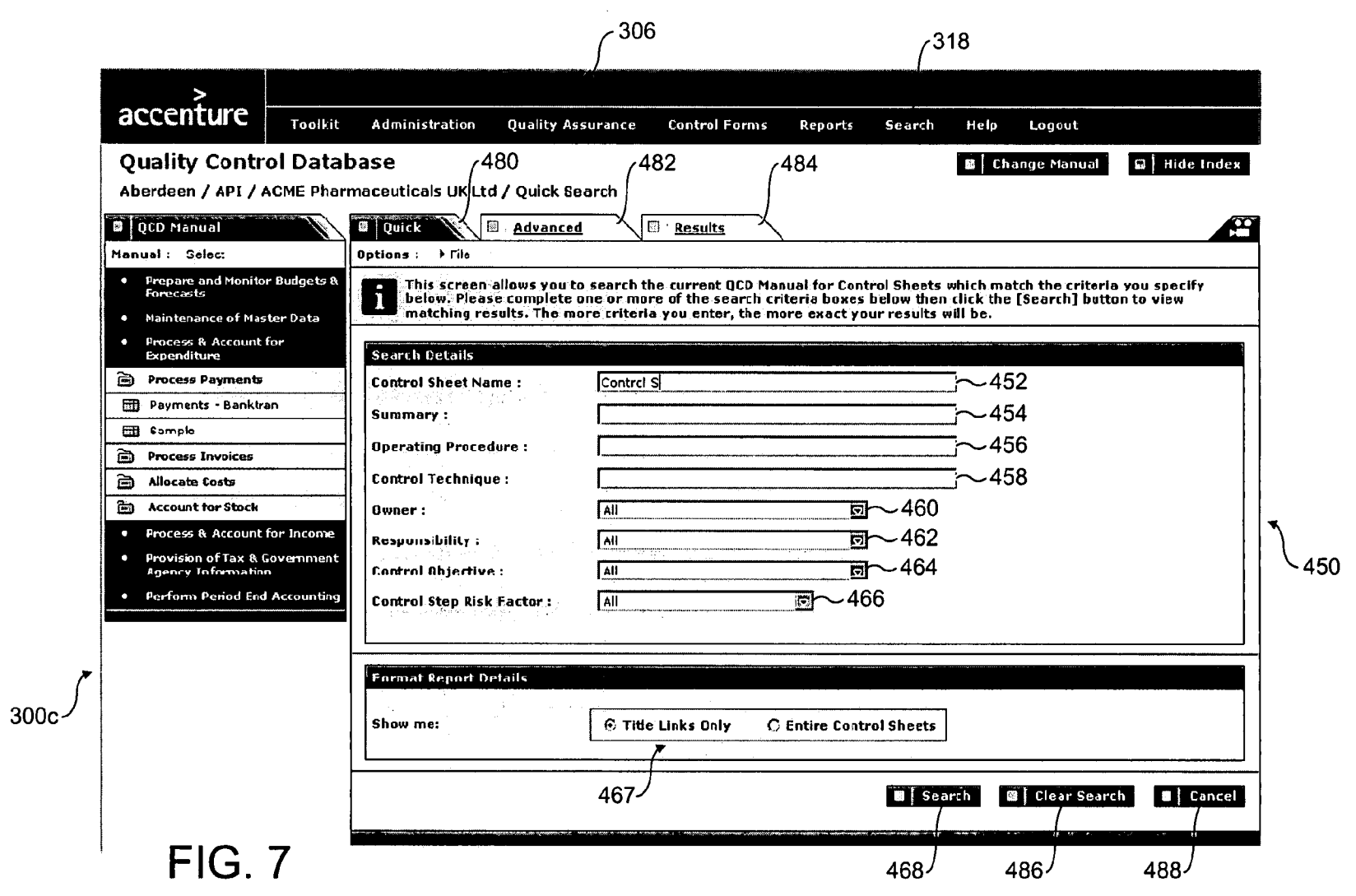
Figure 8:
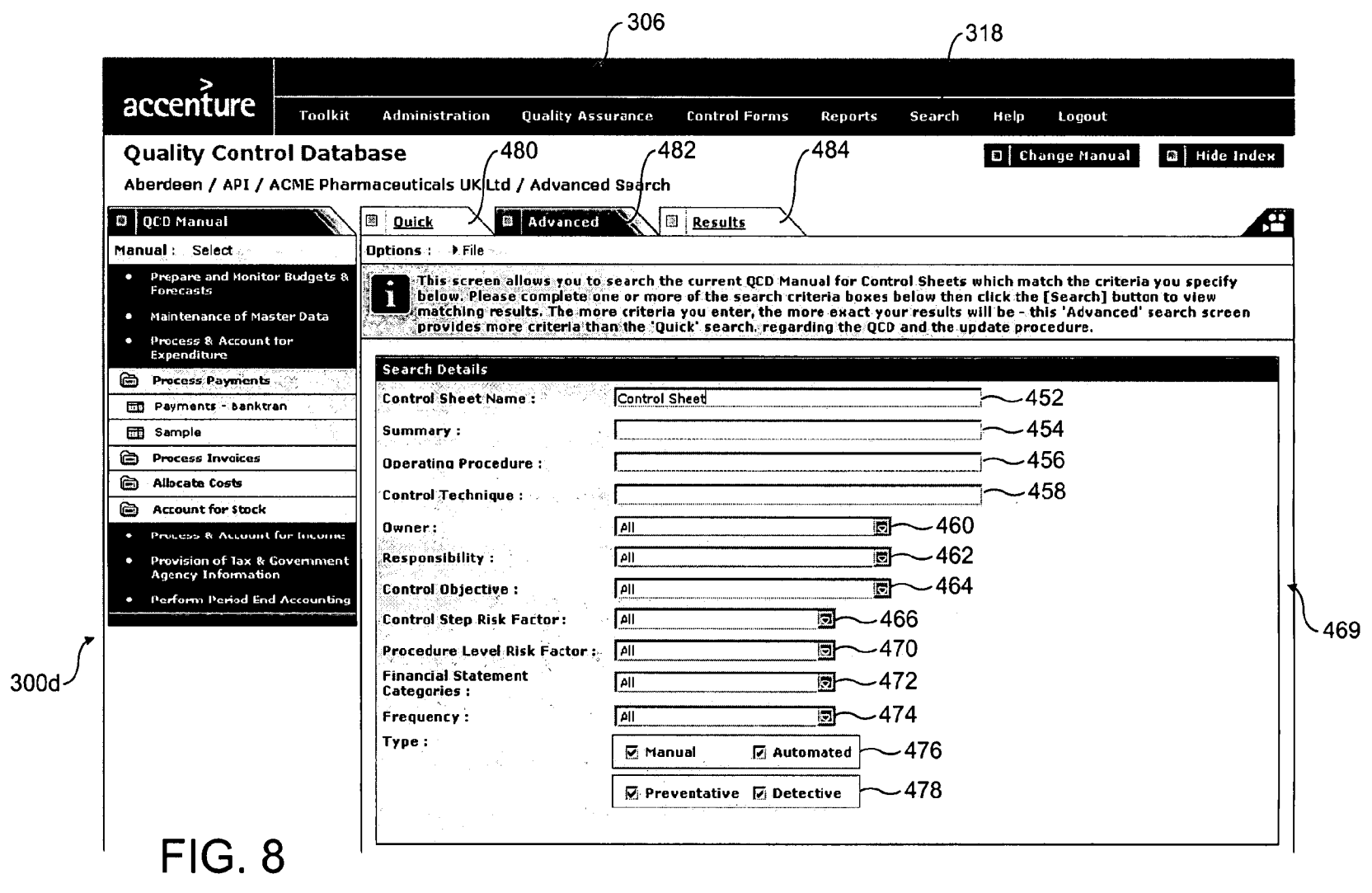

Users can perform a search of a selected manual by navigating to search the web pages stored on the web server computer 14 using the search menu 318 in the menu bar 306. A quick search screen 300c is shown in FIG. 7. An advanced search screen 300d is shown in FIG. 8. The quick search screen 300c includes a quick search criteria area 450 having a number of search fields for receiving search criteria. Each of the search fields corresponds to a feature of the processes that are stored in the database 12 and displayed on the control sheet screen 300a. The search fields include a control sheet name field 452, a summary field 454, an operating procedure field 456 and a control technique field 458. These fields are adapted to receive a string input to be used as a search term. The fields also include an owner field 460, a responsibility field 462, a control objective field 464 and a control step risk factor field 466, all of which receive an input which is selected from a drop down menu of available search terms. A user also selects whether the search results should be displayed as a list of control sheet titles or as a list of entire control sheets by selecting the appropriate radio button in the format report details area 467. Once the required criteria have been entered into one or more fields in the quick search criteria area 450, the user clicks the search button 468 and is provided with a list of the control sheets that match his query.

The advanced search screen 300d includes an advanced search criteria area 469 having the same fields as the quick search criteria area 450 and some additional fields. These additional fields include a procedure level risk factor 470 for searching for the risk that would be attributed to a procedure by virtue of the control techniques associated with that procedure, a balance sheet item field 472 for searching for process that have certain financial statement associated with them, and a frequency field 474, all of which receive an input which is selected from a drop down menu of available search terms. The fields also include a manual/automated field 476 and a preventative/detective field 478 which receive an input from check boxes which the user can select or deselect as desired. Once the required criteria have been entered into one or more fields in the advanced search criteria area 469, the user clicks a search button (not shown in FIG. 8) and is provided with a list of the control sheets that match his query.

Both the quick search 300c and the advanced search 300d screens include a quick search tab 480, an advanced search tab 482 and a search results tab 484. These tabs allow a user to easily navigate between the different search screens and the results page for the last search performed. Also provided is a clear search button 486 (not shown in FIG. 8) for clearing the search fields and a cancel button 488 (not shown in FIG. 8) to return the user to the screen he was viewing before navigating to the search page.

Figure 9:
FIG. 9 shows an electronic form for requesting changes to a control sheet.

Users are able to request changes to the data stored in the database if they believe that there is an error or if a procedure or technique could be improved. Change requests are made in respect of a specific control sheet using the same user interface. Accordingly, while viewing a control sheet on the control sheet screen 300a or the flowchart screen 300b for which they wish to request a change the user accesses the change request web pages via the control forms menu 314 in the menu bar 306. A change request screen 300e is shown in FIG. 9. The change request screen 300e includes a change request electronic form 500 containing fields which the user fills in to identify the changes he is suggesting. These fields include a client field 502 which receives the name of the organization or of the client organization if the user is an outsourcing agent, a requested by field 504 which receives the name of the user, a status field 506 which indicates the status of the change request (initially "New"), and a date field 508 which receives the date of the request. All of these fields are filled in automatically by the user interface based on the user and the control sheet that was being viewed prior to opening the change request page. The user may then fill in his department in the department field 510 if desired.

The user enters the details of his change request by selecting appropriate options from the drop down menus in the type of change field 512, the reason for change field 514, and the priority field 516 which indicates how quickly the change request should be reviewed or acted on. The user then fills in the amendment details field 518 with a detailed description of the proposed change. This field should be completed sufficiently clearly that a person reviewing the change request could understand precisely what changes are required to the database 12 without having to obtain further information from the user. The change request form 500 also includes a number of fields that are not filled in by the user, but exist as part of the electronic change request form and are automatically filled in once an administrator or quality assurance reviewer has reviewed the change request. In this way, a user can return to the electronic change request form to check whether and when the change request has been reviewed and acted on. These further fields include a review by quality assuror field 520 and an associated date field 522 which receive the name of a quality assuror who reviews the change request and the date of review respectively, a completed by administrator field 524 and an associated date field 526 which receive the name of an administrator who acted on the change request and the date of the change respectively, and a published version field 528 which indicates which version of the control sheet contains the change. Once a user has filled in the required forms in the change request form area 500, he clicks the save button 530 to save the form to the database 12. A change request number is allocated to the form for auditing purposes. A quality assurance reviewer is informed of the change request by an email automatically generated by the user interface application and sent by an email application on the user's computer. Alternatively, the user can click the cancel button 532 to cancel the change request.

Figure 10:
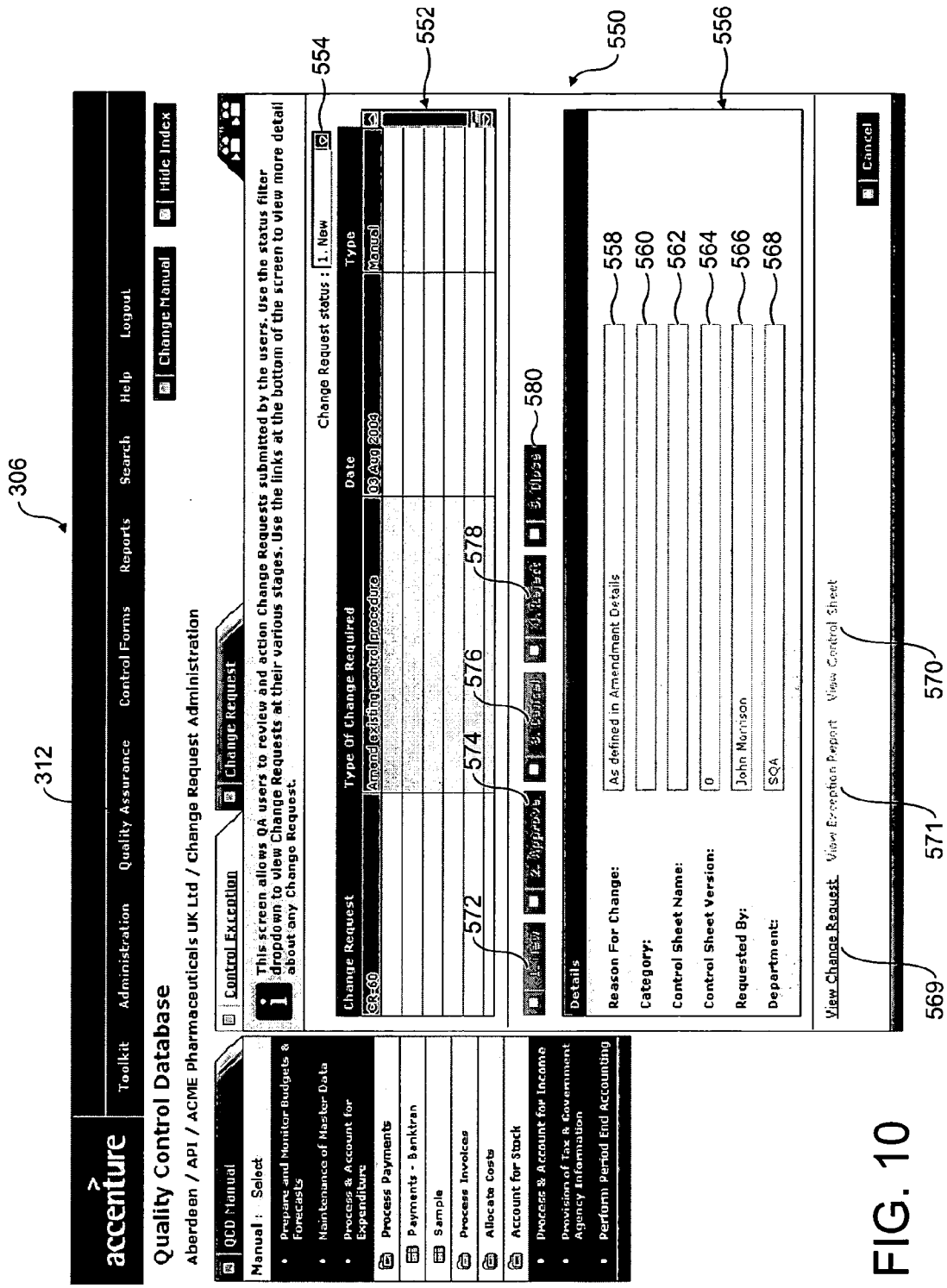
FIG. 10 shows a screen for reviewing change requests made using the electronic form of FIG. 9.

Once a change request form has been submitted and saved, it can be reviewed by a suitably authorised quality assuror or reviewer. A change request review screen 300f is shown in FIG. 10 and is accessed by a reviewer having quality assurance access privileges using the quality assurance menu 312 in the menu bar 306. The change request review screen 300f includes a change request review area 550 including a list of submitted change requests 552 and a drop down menu 554 for selecting the status of the change requests that the user wishes to be displayed in the list 552. Each change request may have a status of "New", "Approved", "Cancelled", "Rejected", "Closed" or "Delegated". If a reviewer selects a change request from the list 552, the details of that change request are displayed in the details window 556. The fields in the details window are populated automatically based on the information entered by a user into the change request form area 500 and include a reason for change field 558, a category field 560, a control sheet name field 562, a control sheet version field 564, a requested by field 566 and a department field 568. To view the details of the change request, the reviewer clicks on the change request link 569. This brings up a new screen showing the amendment details and, for ease of reference, the control sheet that the change request relates to. Alternatively, the reviewer can just bring up the relevant control sheet by clicking on the view control sheet link 570. If the change request has an exception report associated with it, the exception report may be viewed by clicking on the view exception report link 571. Exception reporting is described below in connection with FIGS. 11 and 12. Using these links 569, 570, 571, the reviewer can review the proposed changes to determine whether those changes should be made.

Returning to the change request review area 550, the reviewer can change the status of the selected change request as appropriate by clicking on one of the available status buttons. These buttons include a "New" button 572, an "Approve" button 574, a "Cancel" button 576, a "Reject" button 578, and a "Close" button 580. If the status of the selected change request is changed by a reviewer by clicking one of these buttons, a message such as an email message may be automatically generated by the user interface application and sent using an email application on the reviewer's computer to the user who requested the change in order to inform him of the approval or otherwise of his change request.

A reviewer may not have the necessary permissions to actually make the requested changes but, once the change has been approved by a reviewer, an administrator will be made aware that changes are necessary by an email, for example, generated automatically in the same way as mentioned above. The administrator's powers to amend the database will be described below in connection with FIGS. 17 to 20.

Figure 11:
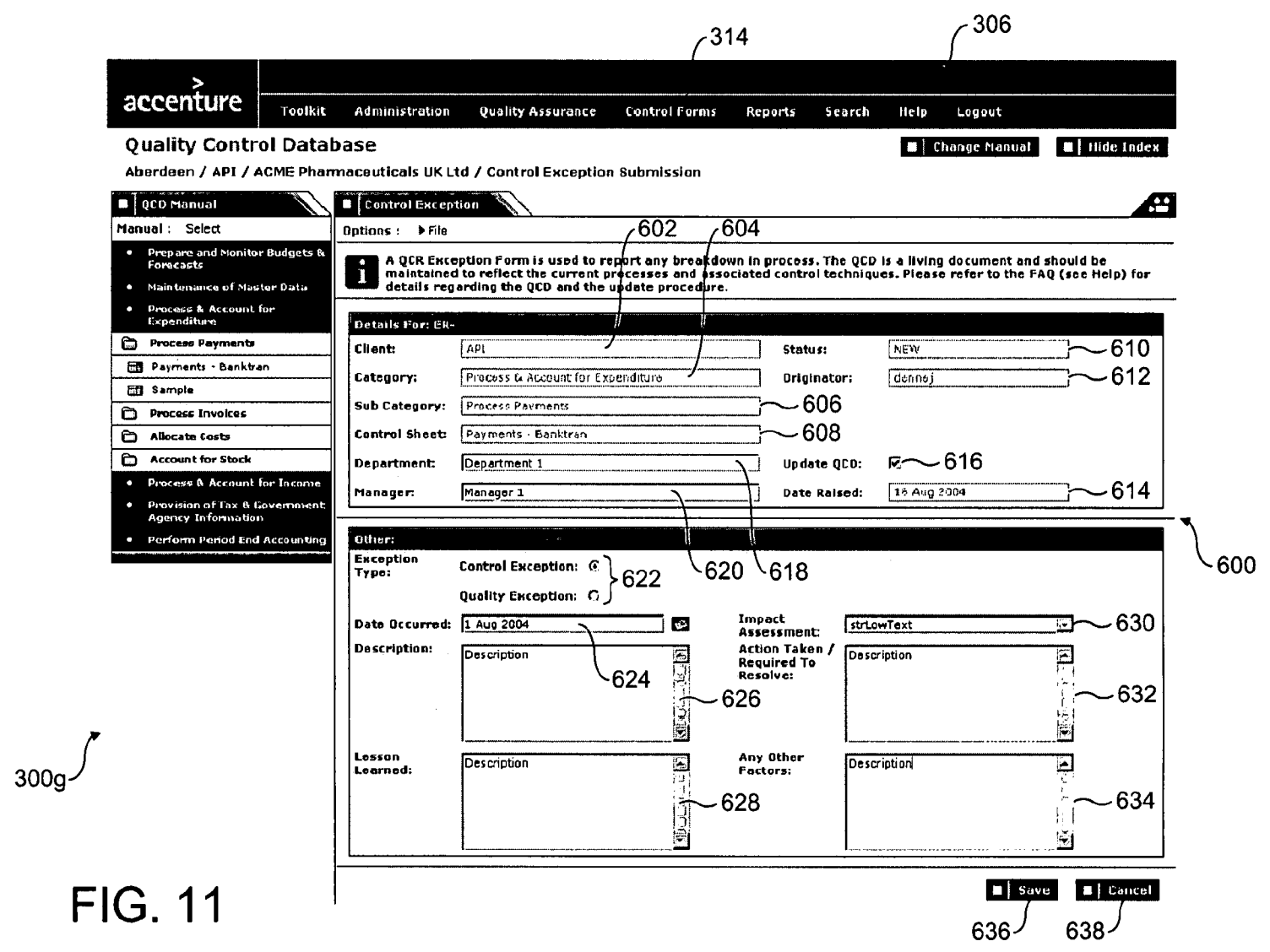

Users are able to report problems that have occurred when carrying out procedures or control techniques. The problems may be control exceptions where a control technique failed, or quality exceptions where a procedure was not carried out to an acceptable level of quality, perhaps due to inadequate control techniques. Control exception or quality exception reports are made in respect of a specific control sheet using the same user interface. Accordingly, while viewing a control sheet on the control sheet screen 300a or the flowchart screen 300b for which they wish to report an exception the user accesses the exception reporting web pages via the control forms menu 314 in the menu bar 306. An exception reporting screen 300g is shown in FIG. 11. The exception reporting screen 300g includes an exception reporting electronic form 600 containing fields which the user fills in to identify the exception he is reporting. These fields include a client field 602 which receives the name of the organization or of the client organization if the user is an outsourcing agent, category 604, sub-category 606 and control sheet 608 fields for receiving the details of the location of the control sheet in the three level structure of the manual, a status field 610 which indicates the status of the exception report (initially "New"), an originator field 612 which receives the name of the user, and a date field 614 which receives the date of the exception report. The fields described above are filled in automatically by the user interface based on the user and the control sheet that was being viewed prior to opening the exception report page. The user may tick the update QCD check box 616 to indicate that the database requires changing as a result of the exception, and can fill in his department in the department field 618 and name his manager in the manager field 620 if desired.

The user indicates whether the exception is a control exception or a quality exception by selecting the appropriate exception type radio button 622, the date occurred field 624 receives an indication of the date on which the exception occurred, the description field 626 receives a description of the exception, the lesson learned field 628 receives a description of the lesson or lessons learned as a result of the exception, the impact assessment field 630 receives an indication of the affect or impact that the exception had on the overall process and a suitable impact factor of "Low", "Med" or "High" is selectable from a drop down menu, the action field 632 receives a description of the action that was taken or that was required to resolve the control exception, the other factors field 634 receives a description of any other factors that could be important to the exception. When a user has completed the exception report, the report is saved to the database 12 by clicking on the save button 636 and allocated an exception report number for auditing purposes. The exception report may be a summary report summarizing the problem or exception with a procedure or process. This summary report may advise future users of the system. For example the summary report may advise future users with lessons learned from the control exception and how it was handled. As discussed above, an automatically generated email may be sent to a quality assurance reviewer informing him that an exception report has been made. The user can cancel the exception report by clicking on the cancel button 638.

If the user making the exception report has ticked the update QCD check box 616 in the exception reporting electronic form 600, clicking on the save button 636 brings up a change request electronic form such as the one described above in relation to FIG. 9. The user must then fill in the change request form in the same way as described above before the exception report and associated change request can be saved and submitted. In this way, the user submitting the exception report is able to suggest a change that could be made in order to prevent the exception from occurring in future.

Figure 12:
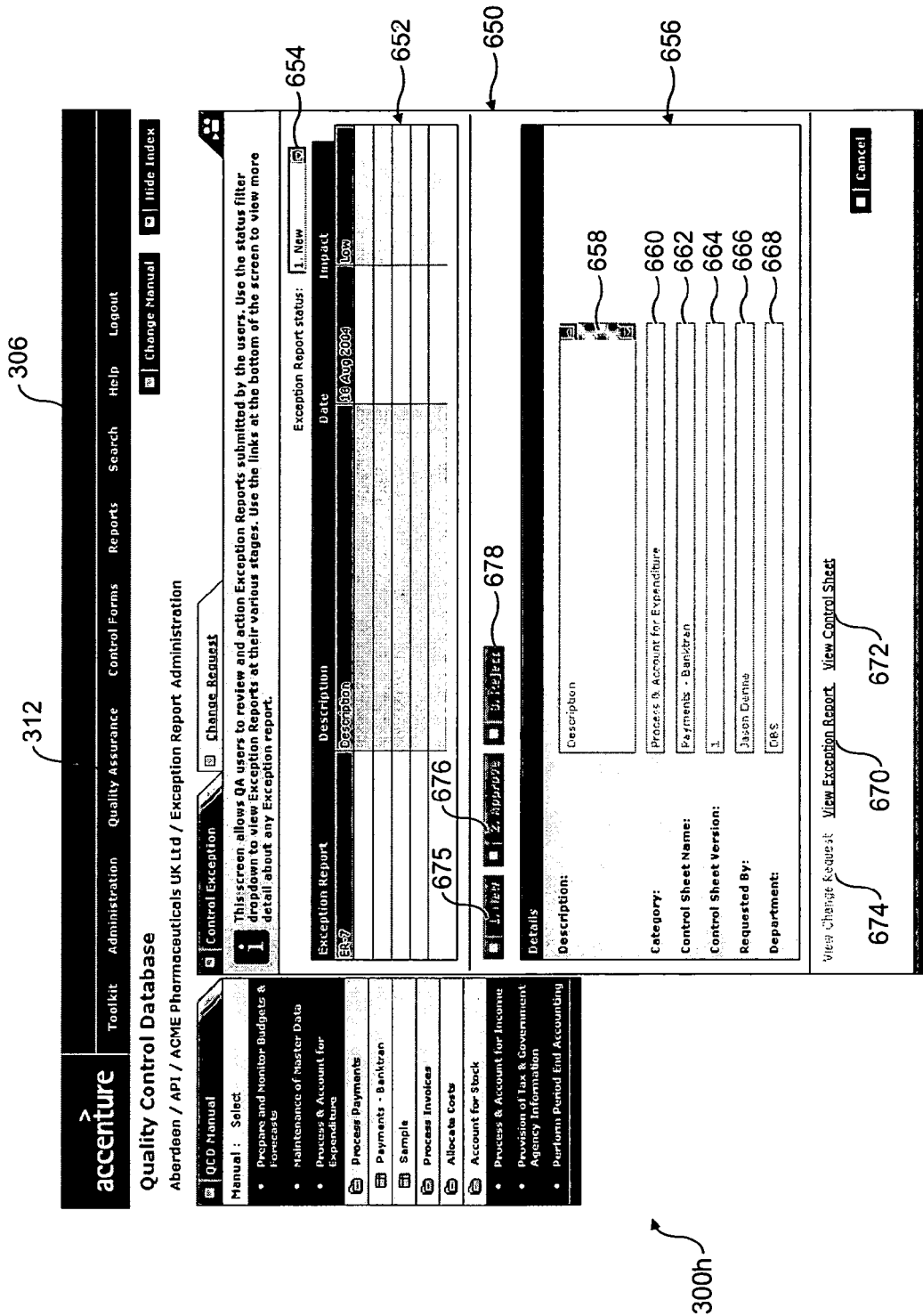
FIG. 12 shows a screen for reviewing control exceptions reported using the electronic form of FIG. 11.

Once an exception report form has been submitted and saved, it can be reviewed by a suitably authorised quality assuror or reviewer. An exception report review screen 300h is shown in FIG. 12 and is accessed by a reviewer having quality assurance access privileges using the quality assurance menu 312 in the menu bar 306. The exception report review screen 300h includes an exception report review area 650 including a list of submitted exception reports 652 and a drop down menu 654 for selecting the status of the exception reports that the reviewer wishes to be displayed in the list 652. Each exception report may have a status of "New", "Approved", or "Rejected". If a reviewer selects an exception report from the list 652, the details of that exception report are displayed in the details window 656. The fields in the details window 656 are populated automatically based on the information entered by a user into the exception report form area 600 and include a description field 658, a category field 660, a control sheet name field 662, a control sheet version field 664, a requested by field 666 and a department field 668. To view the details of the exception report, the reviewer clicks on the exception report link 670. The control sheet associated with the exception can be brought up by clicking on the view control sheet link 672. Also, if there is a change request associated with the exception report, this can be brought up by clicking on the view change request link 674. Using these links 670, 672, 674, the reviewer can review the exception request, the description of how the exception was dealt with and any proposed changes to determine whether any changes are required. From the exception report review area 650, the reviewer can change the status of the selected exception report as appropriate by clicking on one of the available status buttons. These buttons include a "New" button 674, an "Approve" button 676 if the exception report is to be acted on, and a "Reject" button 678 if nothing is to be done in response to the exception report. Again, if the status of the selected exception report is changed by a reviewer by clicking one of these buttons, a message such as an email message may be automatically generated and sent to the user who reported the exception to inform him of the approval or otherwise of his control exception.

A reviewer may not have the necessary permissions to actually action the exception report or to make any necessary or requested changes but, once the exception report has been approved by a reviewer, an administrator will be made aware that action is necessary, preferably by way of an automatically generated email. The administrator's powers to amend the database will be described below in connection with FIGS. 17 to 20.

A user with reporting privileges can generate reports based on the contents of the database 12. Such reports will be useful for auditing purposes, and external auditors will typically be given reporting privileges for a manual of processes that they are to audit so that they can review the processes from a client computer at their own offices rather than visiting the organization to perform an on-site audit. The reporting web pages are accessed via the reports menu 316 in the menu bar 306, from which one or more report types can be selected. Some example report types are described below. However, these are discussed by way of an example only. In general, different organizations and auditors may have different requirements for the types of report that they require and different report types may be made available for those people.

Figure 13:
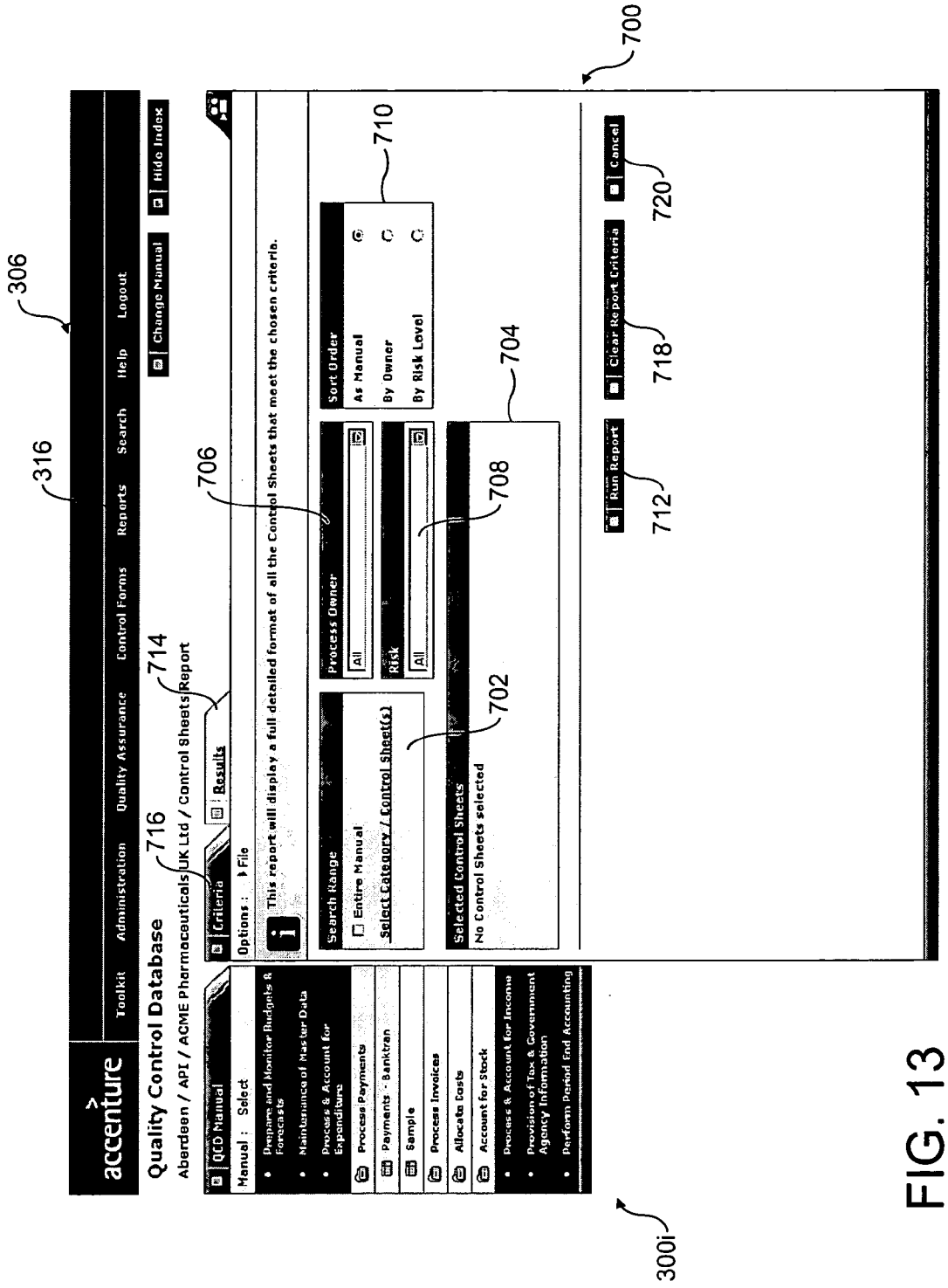
FIG. 13 shows a control sheet report request screen.

A control sheet report screen 300i allowing a user to generate a report of particular control sheets is shown in FIG. 13. The control sheet report screen 300i includes a report criteria area 700 having a number of fields for receiving search criteria. These fields include a search range field 702 from which the user can select either to search the entire manual or to select portions of the manual. If only a portion of the manual is selected, the control sheets that will be searched are listed in the selected control sheets box 704. The user can select particular process owners to search for by using the drop down menu in the process owner field 706. The user can select particular risk factors to search for by using the drop down menu in the risk field 708. The sort order of the search results can be selected by using the radio buttons in the sort order field 710 to select any of "As manual", "By owner", or "By risk level".

Once the desired search criteria have been entered, the user clicks on the run report button 712 to generate a report. This report is displayed under the results tab 714 and lists the control sheets which meet the search criteria. The list includes links to each of the listed control sheets so that those control sheets can be easily reviewed. The report can also be printed out for a paper file, if desired.

The user can generate further reports by clicking on the criteria tab 716 to return to the report criteria area 700. The user can then either edit his previous search criteria or click the clear criteria button 718 to clear all of his previously entered criteria. At any time, the user can click the cancel button 720 to cancel the report.

Figure 14:
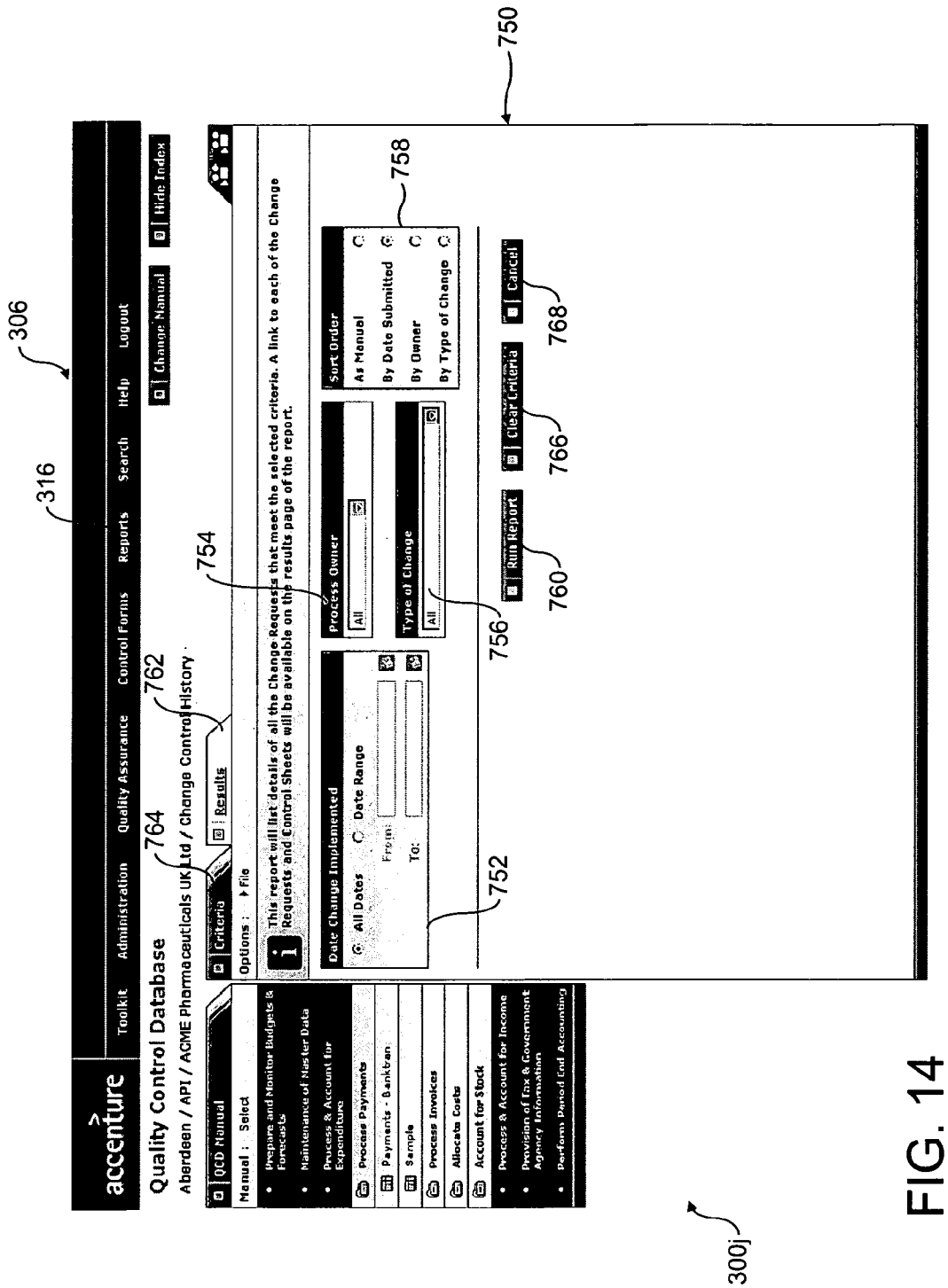
FIG. 14 shows a change history report request screen.

A change history report screen 300j allowing a user to generate a report of control sheets having a particular history of changes or change requests is shown in FIG. 14. Such a report would be particularly useful to auditors wishing to check that an organization has implemented adequate controls. The change history report screen 300j includes a report criteria area 750 having a number of fields for receiving search criteria. These fields include a date change implemented field 752 from which the user can select a date or date range on which a change was implemented, a process owner field 754 from which the user can select particular process owners using the drop down menu, a type of change field 756 from which the user can select particular types of change from the drop down menu and a sort order field 758 from which the user can select to order the search results by any of "As manual", "By date submitted", "By owner", or "By type of change" by selecting the appropriate radio button.

Once the desired search criteria have been entered, the user clicks on the run report button 760 to generate a report. This report is displayed under the results tab 762 and lists the control sheets which have a history of changes that meet the search criteria. The change requests that were actioned to bring about these changes are also included in the list. The list includes links to each of the listed control sheets and the change requests so that these can be easily reviewed. The report can also be printed out for a paper file, if desired.

The user can generate further reports by clicking on the criteria tab 764 to return to the report criteria area 750. The user can then either edit his previous search criteria or click the clear criteria button 766 to clear all of his previously entered criteria. At any time, the user can click the cancel button 768 to cancel the report.

Figure 15:
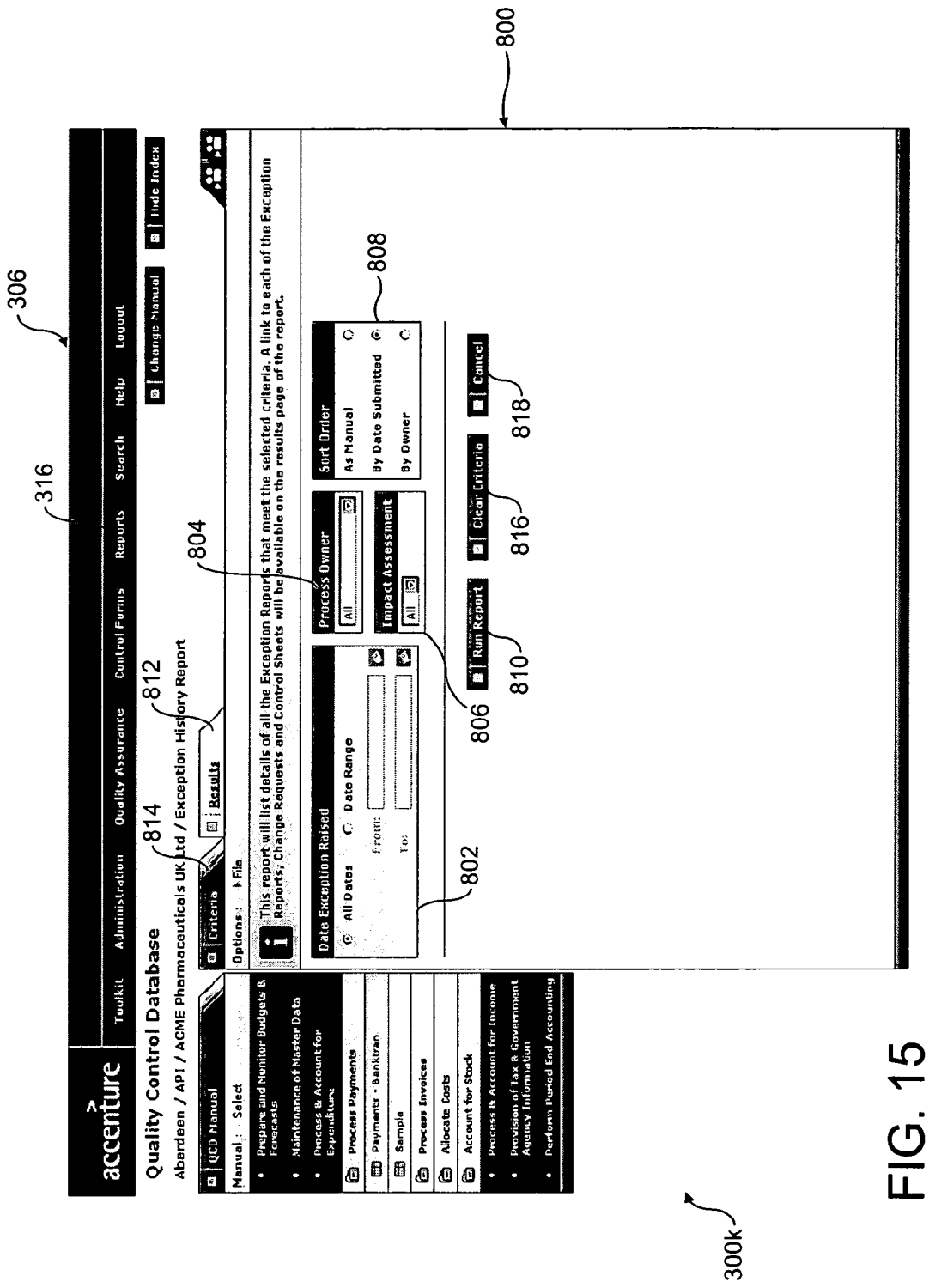
FIG. 15 shows an exception history report request screen.

An exception history report screen 300k allowing a user to generate a report of control sheets that have had exceptions raised against them is shown in FIG. 15. Again, such a report would be particularly useful to an auditor monitoring the efficacy of the internal controls of an organization. The exception history report screen 300k includes a report criteria area 800 having a number of fields for receiving search criteria. These fields include a date change exception raised field 802 from which the user can select a date or date range on which a exception was reported, a process owner field 804 from which the user can select particular process owners using the drop down menu, an impact assessment field 806 from which the user can select particular impact factors from the drop down menu, and a sort order field 808 from which the user can select to order the search results by any of "As manual", "By date submitted", or "By owner" by selecting the appropriate radio button.

Once the desired search criteria have been entered, the user clicks on the run report button 810 to generate a report. This report is displayed under the results tab 812 and lists the control sheets which have an exception history that meets the search criteria. The exception reports that were submitted in respect of these control sheets are also included in the list. The list includes links to each of the listed control sheets and the exception reports so that these can be easily reviewed. The report can also be printed out for a paper file, if desired.

The user can generate further reports by clicking on the criteria tab 814 to return to the report criteria area 800. The user can then either edit his previous search criteria or click the clear criteria button 816 to clear all of his previously entered criteria. At any time, the user can click the cancel button 818 to cancel the report.

Figure 16:
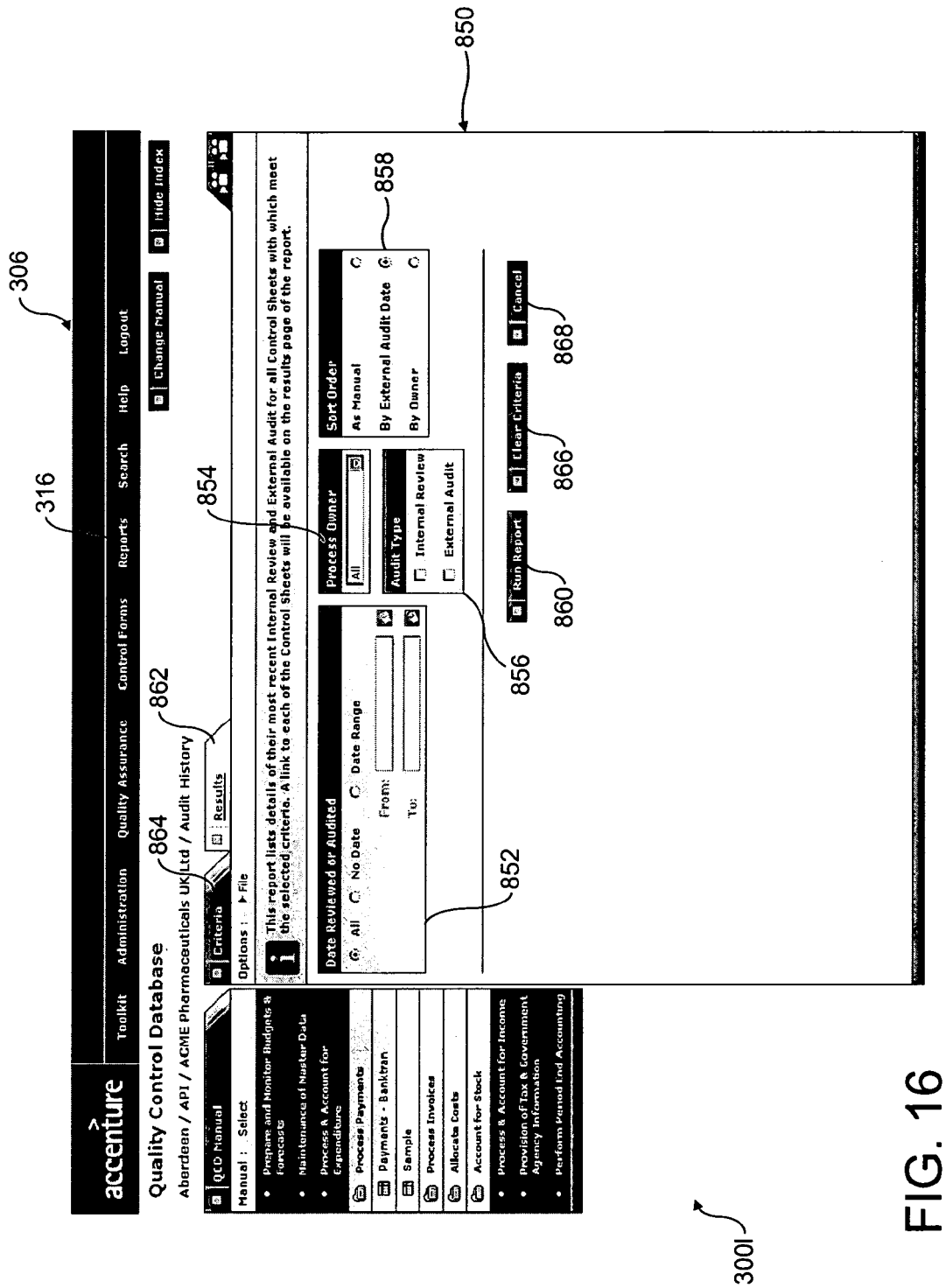
FIG. 16 shows an internal review and external audit report request screen.

An audit history report screen 300l allowing a user to generate a report of control sheets that have been externally audited or internally reviewed is shown in FIG. 16. The audit history report screen 300l includes a report criteria area 850 having a number of fields for receiving search criteria. These fields include a date of review field 852 from which the user can select a date or date range on which a control sheet was reviewed or audited, a process owner field 854 from which the user can select particular process owners using the drop down menu, an audit type field 856 from which the user can select to search either or both of internal reviews or external audits by checking the appropriate boxes, and a sort order field 858 from which the user can select to order the search results by any of "As manual", "By audit date", or "By owner" by selecting the appropriate radio button.

Once the desired search criteria have been entered, the user clicks on the run report button 860 to generate a report. This report is displayed under the results tab 862 and lists the control sheets which have been reviewed or audited according to the search criteria. The list includes links to each of the listed control sheets so that these can be easily reviewed. The report can also be printed out for a paper file, if desired.

The user can generate further reports by clicking on the criteria tab 864 to return to the report criteria area 850. The user can then either edit his previous search criteria or click the clear criteria button 866 to clear all of his previously entered criteria. At any time, the user can click the cancel button 868 to cancel the report.

Other report pages may allow an auditor to search for control sheets associated with particular financial statement categories, or having particular control objectives.

Once the database 12 has been created, it is the responsibility of one or more administrators to maintain the database, and to make changes in response to change requests and exception reports. An administrator uses the same basic user interface as other users, but has access to administrative web pages for editing the data stored in the database 12. These pages permit an administrator to change the basic three level structure of manuals stored in the database 12, adding, moving or deleting new categories as desired, or creating whole new manuals. Administrators are also permitted to change any of the details stored in the database 12 relating to the documented processes.

Figure 17:
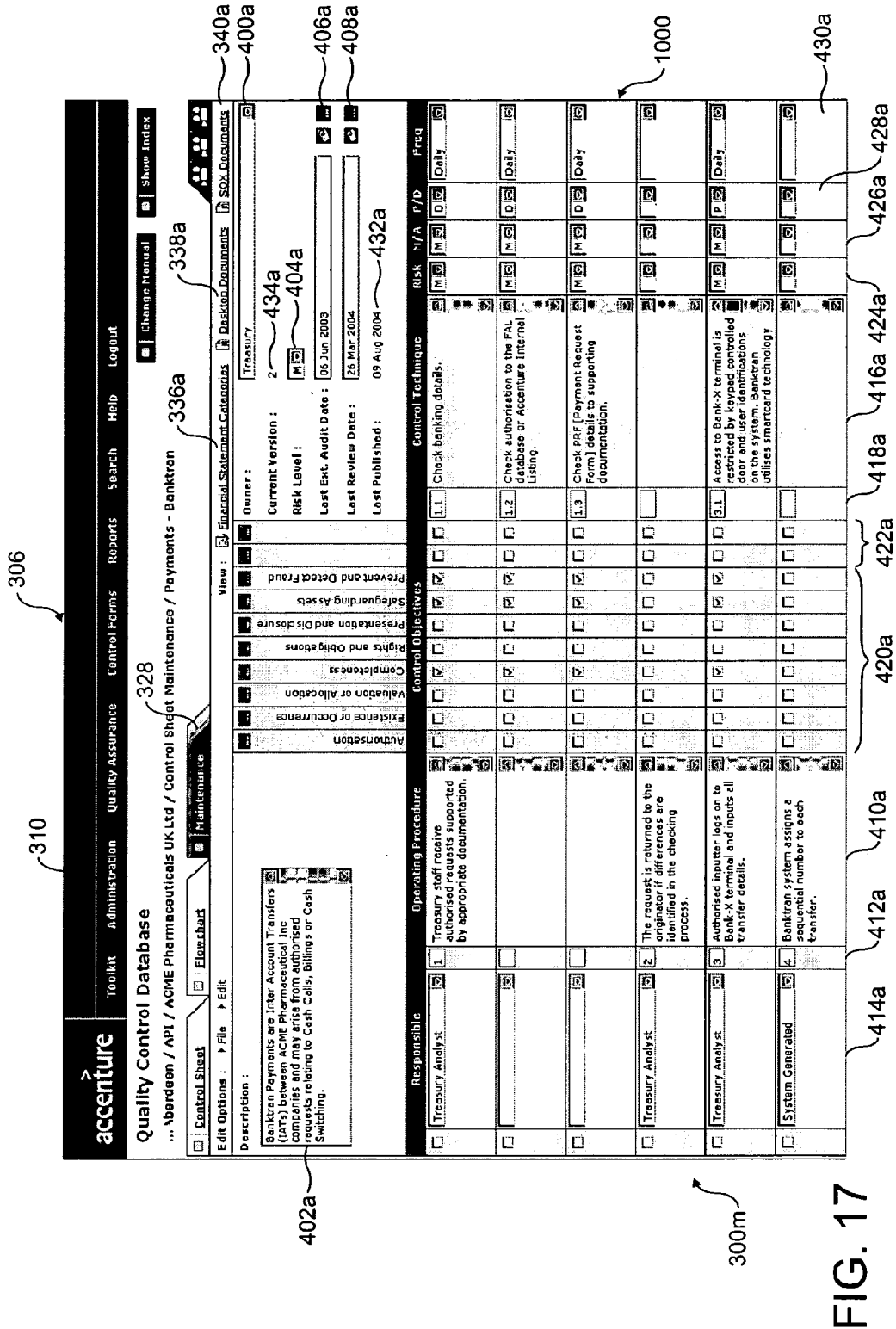
FIG. 17 shows a control sheet administration screen.

In particular, administrators can amend the controls sheets stored in the database 12. A control sheet administration screen 300m is shown in FIG. 17 and is accessed by a user having administrator privileges from the administration menu 310 in the menu bar 306 or by using the maintenance tab 328. The control sheet administration screen 300m includes a control sheet maintenance area 1000 which includes many of the same fields displayed in the control sheet display area 304 of FIG. 4, but each of these fields is editable.

The control sheet maintenance area 1000 includes an editable process owner field 400a, editable using a drop down menu, an editable process summary field 402a, an editable risk level field 404a, editable using a drop down menu, an editable last external audit date field 406a, an editable last internal review date field 408a, editable operating procedure description fields 410a, editable step number fields 412a for each operating procedure, editable responsible person fields 414a for each operating procedure, editable using a drop down menu, editable control technique fields 416a, editable action number fields 418a for each control technique, editable core control objective fields 420a and custom control objective fields 422a for each control technique, editable to select the control objectives by using checkboxes. There are also editable risk factor fields 424a, manual/automatic indicator fields 426a, preventative/detective indicator fields 428a and frequency fields 430a for each control technique, all of which are editable using a drop down menu. Also displayed is a last published date 432a indicating the date on which the displayed version of the control sheet was saved to the database 12 and made available to other users (if applicable), and the version number 434a of the control sheet currently being edited.

Clicking on the financial statement categories link 336a brings up an editable list of the financial statement categories that the selected process affects. Clicking on the desktop documents link 338a or the SOX documents link 340a brings up an editable list of the relevant documents so that the administrator can add or remove documents from the list as desired.

Once an administrator has made the desired changes to the control sheet, these changes are saved to the database 12 and published to make the amended control sheet available to other users. If the changes were made in response to an approved change request or exception report, this fact is recorded for auditing purposes.

Figure 18:
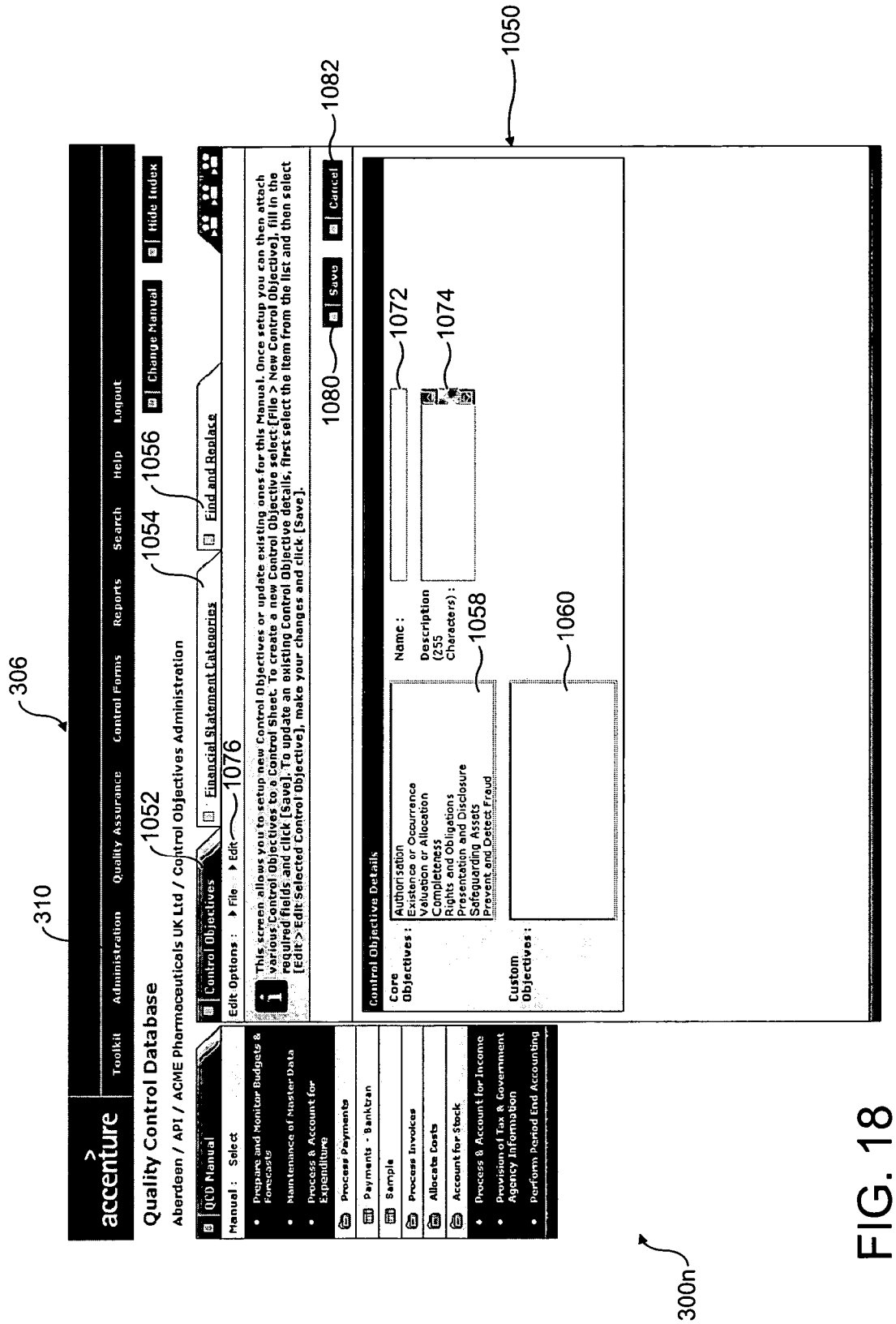
FIG. 18 shows a control objectives administration screen.
Figure 19:
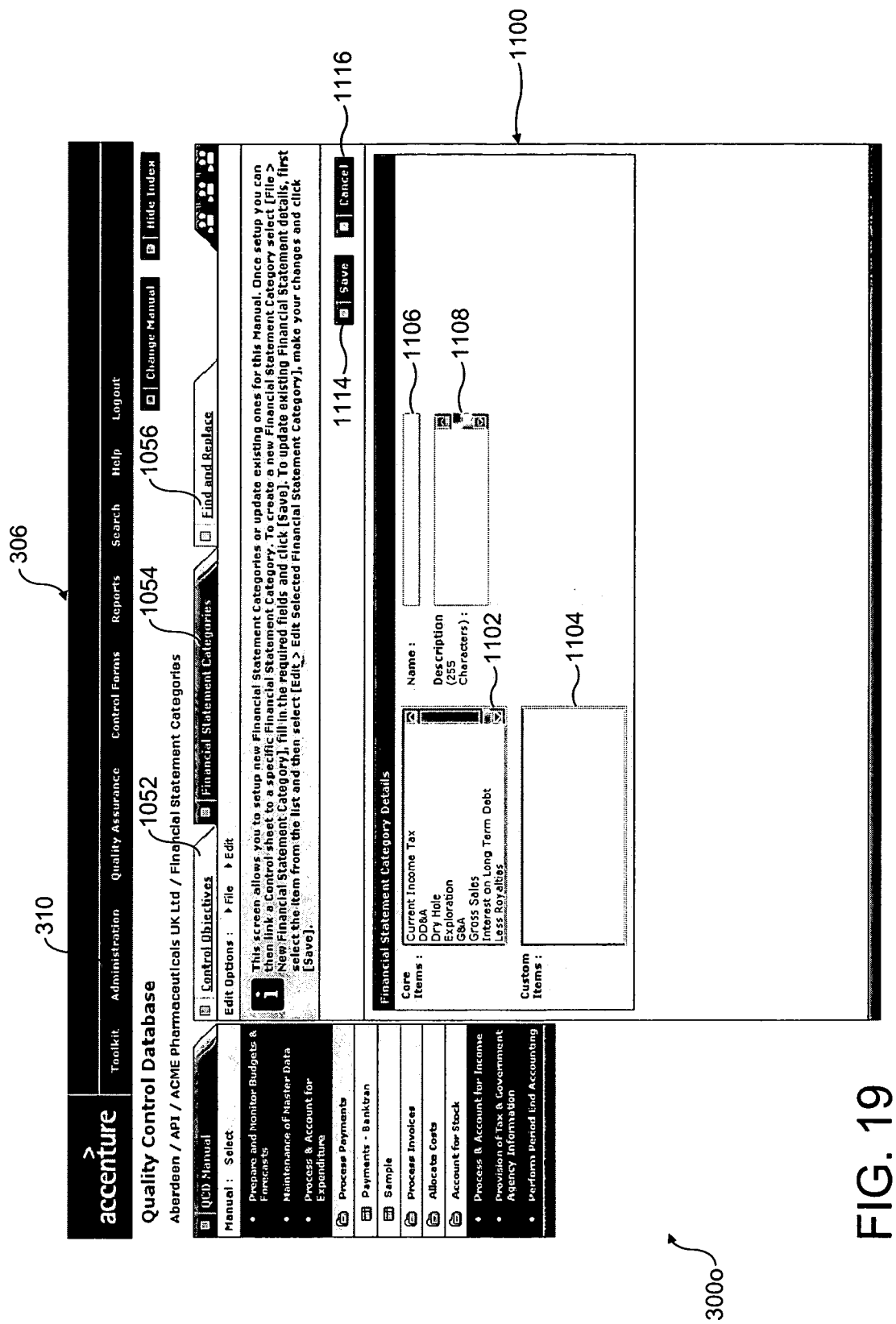
FIG. 19 shows a financial statement categories administration screen.
Figure 20:
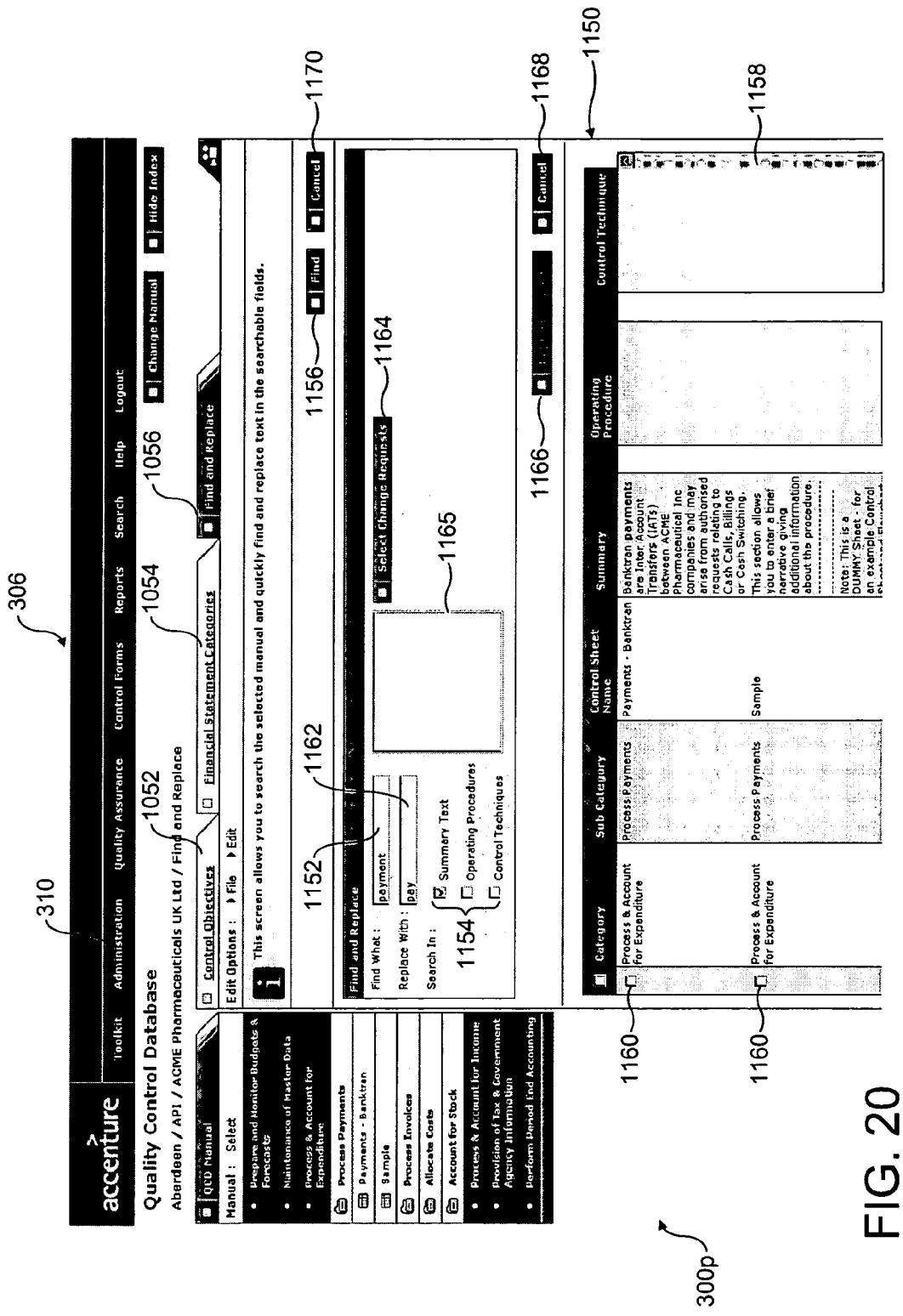
FIG. 20 shows a find and replace screen.

FIG. 18 to 20 show administration screens used for making amendments to the data stored in respect of an entire manual rather than on a control sheet by control sheet basis. The manual editing pages are accessed using the administration menu 310 in the menu bar 306. FIG. 18 shows a control objectives administration screen 300n including a control objectives amendment area 1050 for making changes to the control objectives used in a manual. FIG. 19 shows a financial statement categories administration screen 300o including a financial statement categories amendment area 1100 for making changes to the financial statement categories affected by the processes used in a manual. FIG. 20 shows a find and replace screen 300p including a find and replace area 1150 for making changes to the text used to describe processes, procedures and control techniques throughout a manual. By using the control objectives tab 1052, the financial statement categories tab 1054 and the find and replace tab 1056, a user can quickly navigate between the different screens.

The control objectives amendment area 1050 includes a list of core objectives 1058, which are the COSO objectives plus the "Authorization" objective discussed above, and a list of custom objectives 1060 which are user-defined as required. If the administrator selects one of these objectives, the name of the objective is displayed in the name box 1072 and a brief description of the objective is displayed in the description box 1074. Both the name and the description may be edited by an administrator. By selecting the appropriate options from the file and edit menus 1076, the administrator can create and define a new control objective or can delete a selected objective. Once an administrator has made the desired changes, these changes may be saved to the database 12 by clicking the save button 1080. Alternatively, any unsaved changes can be cancelled by clicking the cancel button 1082.

The financial statement categories amendment area 1100 includes a list of core financial statement categories 1102, and a list of custom financial statement categories 1104 which are user-defined as required. If the administrator selects one of these financial statement categories, the name of the financial statement categories is displayed in the name box 1106 and a brief description of the financial statement categories is displayed in the description box 1108. Both the name and the description may be edited by an administrator. By selecting the appropriate options from the file and edit menus 1110, the administrator can create and define a new financial statement category or can delete a selected financial statement category. Once an administrator has made the desired changes, these changes may be saved to the database 12 by clicking the save button 1114. Alternatively, any unsaved changes can be cancelled by clicking the cancel button 1116.

The find and replace area 1150 includes a find what field 1152 which receives a string search term to be searched for in any of the summary text, operating procedures descriptions or control techniques descriptions of the manual according to which of the search in checkboxes 1154 have been checked. The search is performed when the administrator clicks the find button 1156 and the results of the search are displayed in the search results area 1158 as a list of control sheets containing the search string. Selection checkboxes 1160 may be checked to select particular control sheets in the list. The selected control sheet or sheets can then be used in a text search and replace function by entering a string into the replace with field 1162. The administrator also selects which change requests are being acted on when performing the find and replace by clicking the select change requests button 1161 and selecting a change request or requests as appropriate. Selected change requests are displayed in the change request box 1165. When the administrator clicks the replace selected button 1166, the text matching the search term in the find what field 1152 is replaced with the string in the replace with field 1162 in all of the selected control sheets. These changes are associated with the selected change request or requests listed in the change request box for auditing purposes. Alternatively, the administrator can click the cancel button 1168 to cancel the find and replace. If the administrator wishes to cancel the entire search, he clicks the cancel button 1170.

The preceding describes one particular way in which the present invention can be implemented. However, the present invention is not limited in this regard and is instead defined generally by the following claims.

The invention claimed is:

1. A system for documenting the processes and controls of an organization, comprising:
    a database for storing information describing the steps of processes and controls of an organization, wherein the database stores different versions associated with a particular process, one version varying from another based on a process change request; and
    a web server computer in communication with the database for receiving information from the database and for formatting that information as a plurality of linked web pages, the web pages comprising:
        a process web page for displaying information representing the steps of a selected process of the organization and comprising a link to a list of documents relating to the selected process and a link to a list of financial statement categories affected by the process;
        a flowchart web page for displaying information describing a selected process in the form of a flowchart;
        a report web page, which in response to a process selection from a user, automatically generates and displays a summary report summarizing a problem with the selected process; and a change request web page, which in response to a process selection and change request input from a user, processes the change request.

2. The system of claim 1 wherein at least one web page comprises an indication of a risk associated with the selected process, the process having at least one step, the indication of risk representing an overall assessment of the risk calculated from at least one of the process steps.

3. A system for documenting processes and controls of an organization comprising:
a database storing information describing the steps of processes of an organization, each process comprising at least one procedure to be followed when carrying out the process and any controls associated with the or each procedure, wherein the database stores different versions associated with a particular process, one version varying from another based on a process change request; and
a computer programmed to receive information describing the steps of a process from the database and having a user interface application thereon, the user interface application programmed to display the information describing the steps of a process and, in response to an input from a user, programmed to display a summary report summarizing a problem with the process and to save the summary report to the database.

4. A system as claimed in claim 3 wherein the database is accessible over a public network and the user interface application is further configured to display, in response to an input from an auditor, a summary report summarizing a problem with a process, retrieved from the database over the public network.

5. A system as claimed in claim 3 wherein the user interface application is further programmed to display, in response to an input from a reviewer, a saved summary report summarizing a problem with a process.

6. A system as claimed in claim 3 wherein the user interface application is further programmed to receive from a reviewer, an input indicating approval of a summary report summarizing a problem with a process.

7. A system as claimed in claim 3 wherein the user interface application is a web browser and wherein the computer is programmed to receive the information describing the steps of a process formatted as at least one web page.

8. A system as claimed in claim 7 wherein the at least one web page comprises a viewing web page for viewing the information describing the steps of a process and a summary reporting web page for receiving from the user the summary report summarizing the problem with the process, the viewing web page having a link to the summary reporting web page.

9. A system as claimed in claim 3 wherein the summary report comprises a request for a change to the process.

10. A system as claimed in claim 3 wherein a reviewer is informed by an email automatically generated by the user interface application when a summary report summarizing a problem with a process has been saved to the database.

11. A system as claimed in claim 7, wherein the at least one web page comprises an indication of a risk associated with the process, the indication of risk representing an overall assessment of the risk, calculated from at least one of the process procedures.

12. A method of documenting processes and controls of an organization comprising:
storing in a database, information describing the steps of processes of an organization, each process comprising at least one procedure to be followed when carrying out the process and any controls associated with the or each procedure;
storing in the database, different versions associated with a particular process, one version varying from another based on a process change request;
at a web server computer in communication with the database, generating a plurality of linked web pages, the web pages comprising:
a process web page for displaying information representing the steps of a selected process of the organization and comprising a link to a list of documents relating to the selected process and a link to a list of financial statement categories affected by the process;
a flowchart web page for displaying information describing a selected process in the form of a flowchart;
a report web page, which in response to a process selection from a user, automatically generates and displays a summary report summarizing a problem with the selected process; and
a change request web page, which in response to a process selection and change request input from a user, processes the change request.

13. A method as claimed in claim 12 further comprising generating a report web page, which in response to a selection from a user, displays a saved summary report summarizing a problem with a process.

14. A method as claimed in claim 12 further comprising informing a reviewer when a summary report summarizing a problem with a process has been saved to the database by:
automatically generating an email message to the reviewer informing him that a summary report summarizing a problem with a process has been saved to the database; and
sending the email message to the reviewer.

15. A method as claimed in claim 12, wherein the at least one web page comprises an indication of a risk associated with the process, the indication of risk representing an overall assessment of the risk calculated from at least one of the process steps.

16. The system of claim 1 wherein the flowchart indicates a responsible entity associated with each step of the selected process.

17. A system as claimed in claim 1 wherein the process webpage, in response to a version selection from a user, displays a historical version of the selected process corresponding to the version selection.

18. A system as claimed in claim 3 wherein the user interface application is further programmed to display, in response to a version selection from a user, a historical version of the selected process corresponding to the version selection.

19. A method as claimed in claim 12 wherein the report web page is further configured to receive information from an auditor relating to the summary report.

20. A method as claimed in claim 12 wherein the report webpage is configured to accept from the user an input indicating approval of the summary report.

21. A method as claimed in claim 12 wherein the flowchart indicates a responsible entity associated with each step of the selected process.

22. A method as claimed in claim 12 wherein the process webpage, in response to a version selection from a user, displays a historical version of the selected process corresponding to the version selection.

* * * * *

UNITED STATES PATENT AND TRADEMARK OFFICE
CERTIFICATE OF CORRECTION

PATENT NO. : 8,234,136 B2
APPLICATION NO. : 11/216494
DATED : July 31, 2012
INVENTOR(S) : Scott Hanly McDougall et al.

It is certified that error appears in the above-identified patent and that said Letters Patent is hereby corrected as shown below:

Title Page

Following item (65), add

--(30)  Foreign Application Priority Data

Sep. 3, 2004   (GB) ............ 0419607.7--

Claims

Claim 20, col. 26, line 57, "webpage" should read --web page--

Claim 22, col. 26, line 63, "webpage" should read --web page--

Signed and Sealed this
Twenty-third Day of April, 2013

Teresa Stanek Rea
*Acting Director of the United States Patent and Trademark Office*